US012591069B2

(12) United States Patent
Jayaram et al.

(10) Patent No.: US 12,591,069 B2
(45) Date of Patent: Mar. 31, 2026

(54) REAL TIME GNSS SPACE VEHICLE BROADCAST DATA QUALITY MONITORING USING CROWD-SOURCED DATA FROM ROAD SIDE UNITS

(71) Applicant: QUALCOMM Incorporated, San Diego, CA (US)

(72) Inventors: Chandrasekhar Jayaram, Bangalore (IN); Santoshkumar Zalake, Bengaluru (IN); Mukesh Kumar, Bangalore (IN); Srinivas Gangji, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 18/061,790

(22) Filed: Dec. 5, 2022

(65) Prior Publication Data

US 2024/0183992 A1 Jun. 6, 2024

(51) Int. Cl.
*G01S 19/20* (2010.01)
*G01S 19/07* (2010.01)
*G01S 19/27* (2010.01)

(52) U.S. Cl.
CPC .............. *G01S 19/20* (2013.01); *G01S 19/07* (2013.01); *G01S 19/27* (2013.01)

(58) Field of Classification Search
CPC ........... G01S 19/20; G01S 19/07; G01S 19/27
USPC .......................... 342/357.44, 357.66, 357.58
See application file for complete search history.

(56) References Cited

U.S. PATENT DOCUMENTS

| | | | | |
|---|---|---|---|---|
| 6,839,021 B2 * | 1/2005 | Sheynblat | ............. | G01S 5/0036 |
| | | | | 342/357.35 |
| 7,443,340 B2 * | 10/2008 | Abraham | ............. | B64G 1/1014 |
| | | | | 342/357.43 |
| 7,701,387 B2 * | 4/2010 | Syrjarinne | ............. | G01S 19/05 |
| | | | | 342/357.42 |
| 8,228,230 B1 * | 7/2012 | Capozio | ................. | G01S 19/27 |
| | | | | 342/357.66 |
| 8,538,682 B1 * | 9/2013 | Vankatraman | .......... | G01S 19/27 |
| | | | | 701/472 |

(Continued)

FOREIGN PATENT DOCUMENTS

| | | | | | |
|---|---|---|---|---|---|
| CN | 119916416 A | * | 5/2025 | ............. | G01S 19/42 |
| EP | 1864152 B1 | * | 2/2012 | ............. | G01S 19/23 |

(Continued)

OTHER PUBLICATIONS

International Search Report and Written Opinion—PCT/US2023/033894—ISA/EPO—Feb. 1, 2024.

*Primary Examiner* — Chuong P Nguyen
(74) *Attorney, Agent, or Firm* — Thien T. Nguyen

(57) ABSTRACT

Aspects presented herein may enable a network entity to determine whether there are any errors in the broadcast data from one or more space vehicles (SVs) based on crowd-sourcing information from a set of road side units (RSUs). In one aspect, a network entity obtains at least one measurement for a satellite associated with a set of RSUs. The network entity estimates a position of the satellite based on the at least one measurement and locations of the set of RSUs. The network entity identifies whether the estimated position of the satellite is associated with an error based on a comparison of the estimated position of the satellite with ephemeris data or almanac data of the satellite.

19 Claims, 12 Drawing Sheets

(56)                    References Cited

U.S. PATENT DOCUMENTS

| | | | | |
|---|---|---|---|---|
| 8,665,156 | B2 * | 3/2014 | Ische | G01S 5/0009 |
| | | | | 342/464 |
| 8,847,820 | B2 * | 9/2014 | Landau | G01S 19/43 |
| | | | | 342/357.66 |
| 8,963,772 | B2 * | 2/2015 | Xu | G01S 19/33 |
| | | | | 342/357.66 |
| 9,274,225 | B2 * | 3/2016 | Abraham | B64G 1/1014 |
| 9,594,168 | B2 * | 3/2017 | Vollath | G01S 19/44 |
| 10,345,448 | B2 * | 7/2019 | McDonald | G01S 19/074 |
| 10,809,388 | B1 * | 10/2020 | Carcanague | G01S 19/49 |
| 11,709,280 | B2 * | 7/2023 | Brandl | G06F 30/33 |
| | | | | 716/136 |
| 2012/0154210 | A1 | 6/2012 | Landau et al. | |
| 2015/0153455 | A1 | 6/2015 | Abraham et al. | |
| 2017/0131406 | A1 * | 5/2017 | Li | H04W 4/40 |
| 2017/0212241 | A1 | 7/2017 | McDonald et al. | |
| 2019/0196022 | A1 * | 6/2019 | Rezaei | G01S 19/426 |
| 2020/0096649 | A1 | 3/2020 | Brandl et al. | |
| 2021/0109228 | A1 * | 4/2021 | Rautalin | G01S 19/27 |
| 2023/0258815 | A1 * | 8/2023 | Ghimire | G01S 19/08 |
| | | | | 455/456.1 |
| 2024/0280706 | A1 * | 8/2024 | Peng | G01S 5/009 |

FOREIGN PATENT DOCUMENTS

| | | | | | |
|---|---|---|---|---|---|
| EP | 3220165 | B1 * | 10/2022 | | G01S 19/27 |
| WO | 2022084401 | A2 | 4/2022 | | |

* cited by examiner $\phi$ = Azimuth angle of departure (A-AoD)
$\theta$ = Zenith angle of departure (Z-AoD)
$\rho$ = Distance
$\phi'$ = Azimuth angle of arrival (A-AoA)
$\theta'$ = Zenith angle of arrival (Z-AoA)

700

A network of RSUs 704

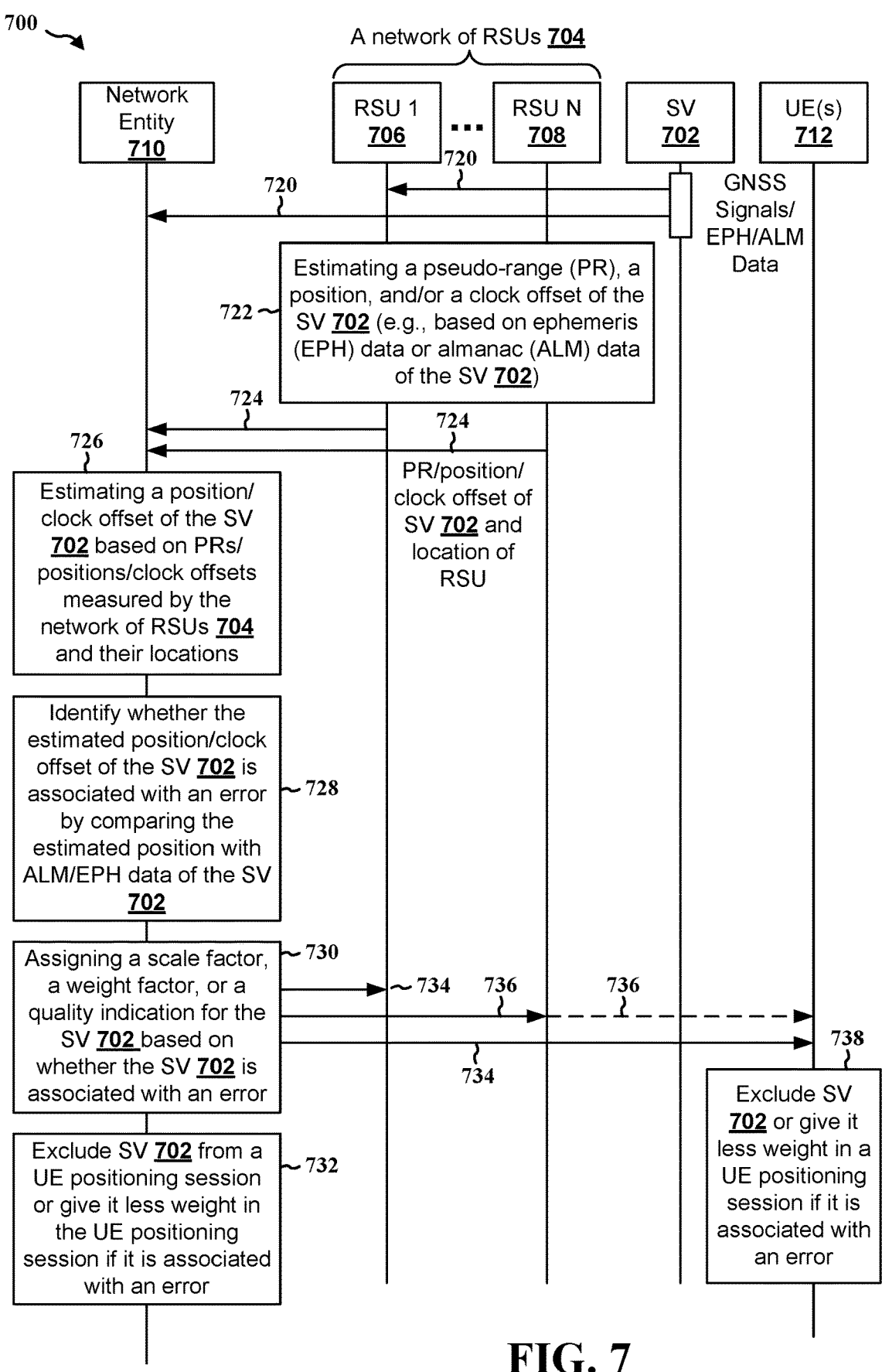

| Network Entity 710 | RSU 1 706 | ... | RSU N 708 | SV 702 | UE(s) 712 |

GNSS Signals/ EPH/ALM Data

720

720

720

722 — Estimating a pseudo-range (PR), a position, and/or a clock offset of the SV 702 (e.g., based on ephemeris (EPH) data or almanac (ALM) data of the SV 702)

724

724

PR/position/ clock offset of SV 702 and location of RSU

726

Estimating a position/ clock offset of the SV 702 based on PRs/ positions/clock offsets measured by the network of RSUs 704 and their locations Identify whether the estimated position/clock offset of the SV 702 is associated with an error by comparing the estimated position with ALM/EPH data of the SV 702 — 728

Assigning a scale factor, a weight factor, or a quality indication for the SV 702 based on whether the SV 702 is associated with an error — 730

734

736

736

734

738

Exclude SV 702 from a UE positioning session or give it less weight in the UE positioning session if it is associated with an error — 732

Exclude SV 702 or give it less weight in a UE positioning session if it is associated with an error

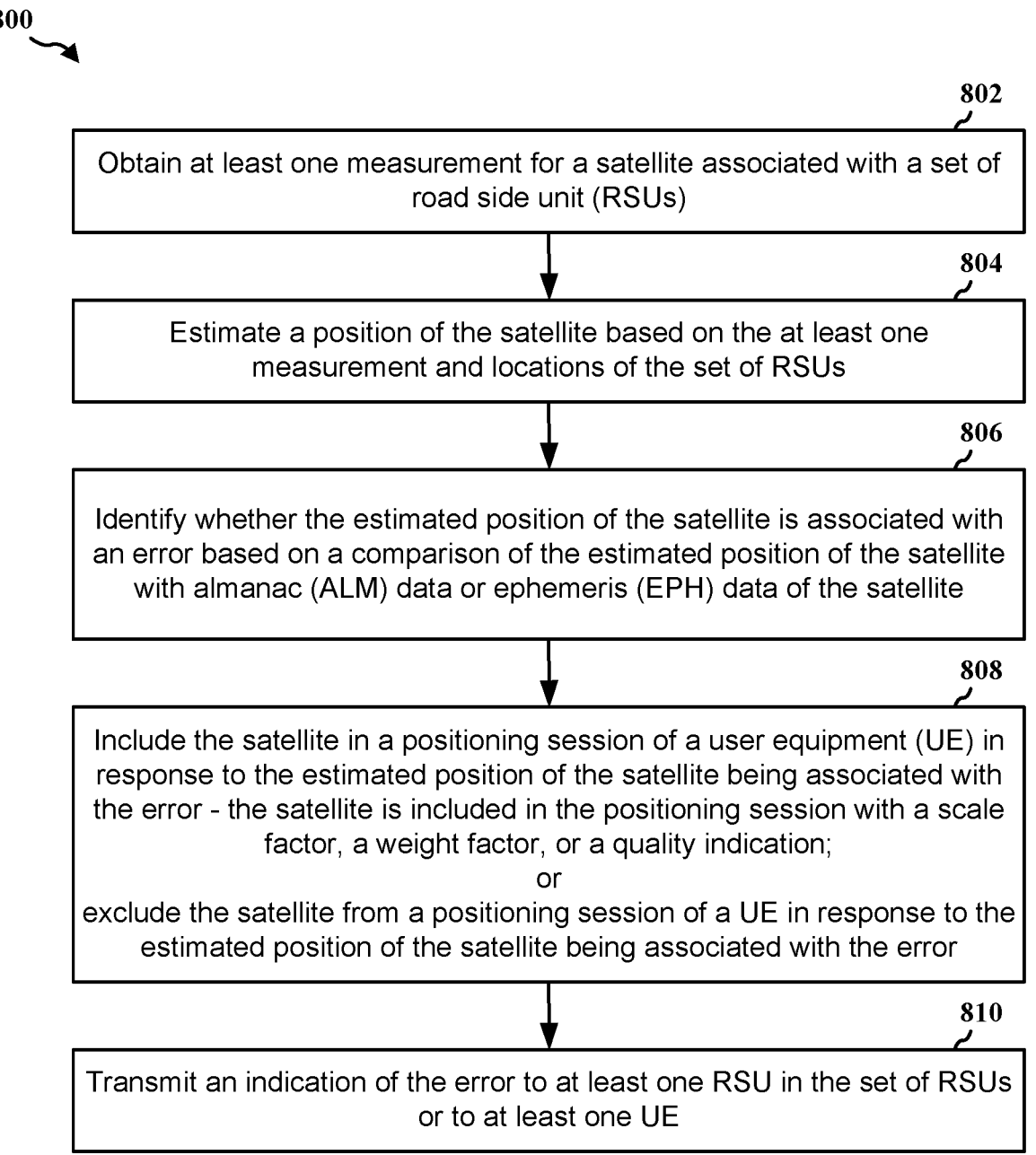

802

Obtain at least one measurement for a satellite associated with a set of road side unit (RSUs)

804

Estimate a position of the satellite based on the at least one measurement and locations of the set of RSUs

806

Identify whether the estimated position of the satellite is associated with an error based on a comparison of the estimated position of the satellite with almanac (ALM) data or ephemeris (EPH) data of the satellite

808

Include the satellite in a positioning session of a user equipment (UE) in response to the estimated position of the satellite being associated with the error - the satellite is included in the positioning session with a scale factor, a weight factor, or a quality indication;
or
exclude the satellite from a positioning session of a UE in response to the estimated position of the satellite being associated with the error

810

Transmit an indication of the error to at least one RSU in the set of RSUs or to at least one UE

FIG. 8

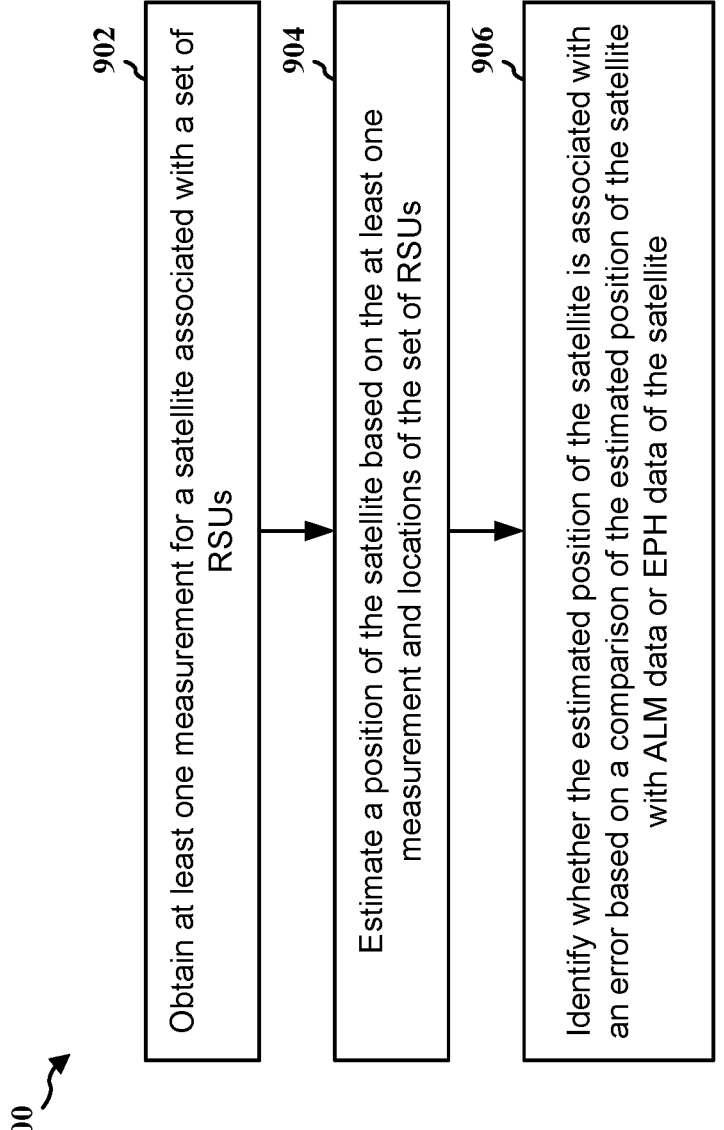

900

902 Obtain at least one measurement for a satellite associated with a set of RSUs 904 Estimate a position of the satellite based on the at least one measurement and locations of the set of RSUs 906 Identify whether the estimated position of the satellite is associated with an error based on a comparison of the estimated position of the satellite with ALM data or EPH data of the satellite

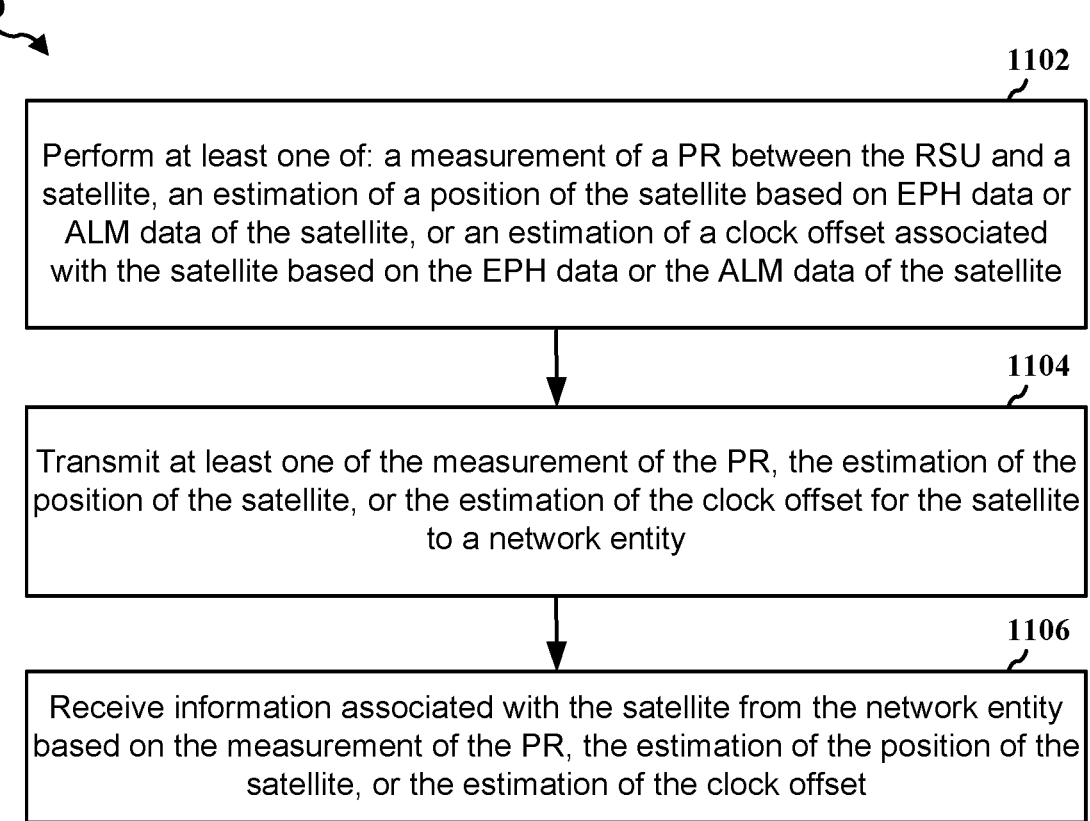

Perform at least one of: a measurement of a PR between the RSU and a satellite, an estimation of a position of the satellite based on EPH data or ALM data of the satellite, or an estimation of a clock offset associated with the satellite based on the EPH data or the ALM data of the satellite

1104

Transmit at least one of the measurement of the PR, the estimation of the position of the satellite, or the estimation of the clock offset for the satellite to a network entity

1106

Receive information associated with the satellite from the network entity based on the measurement of the PR, the estimation of the position of the satellite, or the estimation of the clock offset

FIG. 11

REAL TIME GNSS SPACE VEHICLE BROADCAST DATA QUALITY MONITORING USING CROWD-SOURCED DATA FROM ROAD SIDE UNITS

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus obtains at least one measurement for a satellite associated with a set of road side unit (RSUs). The apparatus estimates a position of the satellite based on the at least one measurement and locations of the set of RSUs. The apparatus identifies whether the estimated position of the satellite is associated with an error based on a comparison of the estimated position of the satellite with almanac (ALM) data or ephemeris (EPH) data of the satellite.

In an aspect of the disclosure, a method, a computer-readable medium, and an apparatus are provided. The apparatus performs at least one of: a measurement of a pseudo-range (PR) between the RSU and a satellite, an estimation of a position of the satellite based on EPH data or ALM data of the satellite, or an estimation of a clock offset associated with the satellite based on the EPH data or the ALM data of the satellite. The apparatus transmits at least one of the measurement of the PR, the estimation of the position of the satellite, or the estimation of the clock offset for the satellite to a network entity. The apparatus receives information associated with the satellite from the network entity based on the measurement of the PR, the estimation of the position of the satellite, or the estimation of the clock offset.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a communication flow illustrating an example of a network entity providing GNSS broadcast data quality monitoring for a set of SVs based on crowd-sourced data from a network of RSUs in accordance with various aspects of the present disclosure.

FIG. 8 is a flowchart of a method of wireless communication.

FIG. 9 is a flowchart of a method of wireless communication.

FIG. 11 is a flowchart of a method of wireless communication.

DETAILED DESCRIPTION

Figure 1:
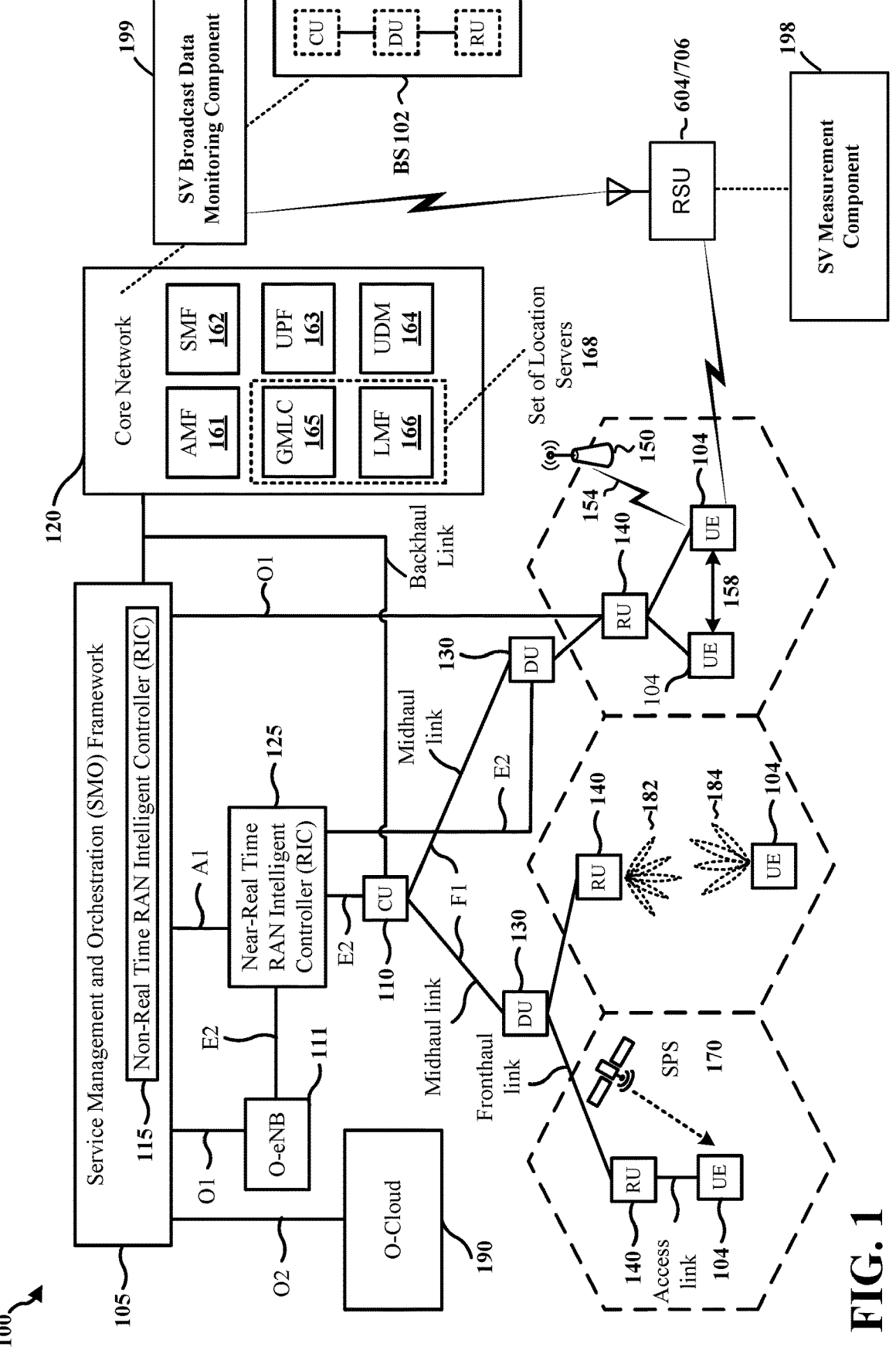
FIG. 1 is a diagram illustrating an example of a wireless communications system and an access network.

Aspects presented herein may enable a GNSS device (e.g., a UE, a GNSS receiver, etc.) or a positioning entity (e.g., a location server, a location management function (LMF), a network node, a base station, etc.) to determine whether there are any errors in data broadcasted from one or more SVs to ensure the continuity and the availability of accurate position and/or time information is received by the GNSS device or the positioning entity, which may be suitable for vehicle-to-everything (V2X) and cellular V2X (C-V2X) applications. For example, in one aspect of the present disclosure, a network of RSUs may be used for estimating the position and/or the clock offset of an SV. As the position of an RSU is typically known (e.g., an RSU may be similar to a beacon with a known position and clock), the range between a particular SV and the network of RSUs may be measured and used for estimating the position of the SV. Then, the estimated position of the SV may be compared with the ephemeris information and/or the almanac information broadcasted from the SV (or received from another entity) to determine whether there is an error associated with the SV. The SV may be isolated/excluded from positioning if the SV is determined to broadcast erroneous information. This process may be repeated for multiple SVs (e.g., all SVs participating in a positioning session), thereby improving the positioning accuracy for the GNSS device.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface).

Such virtualized network elements can include, but are not limited to, CUs 110, DUS 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other.

Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the core network 120 and/or the base station 102 may be configured to obtain at least one measurement for a satellite associated with a set of RSUs; estimate a position of the satellite based on the at least one measurement and locations of the set of RSUs; and identify whether the estimated position of the satellite is associated with an error based on a comparison of the estimated position of the satellite with ALM data or EPH data of the satellite (e.g., via the SV broadcast data monitoring component 199).

In certain aspects, the UE 104 and/or the RSU 604/706 may be configured to perform at least one of: a measurement of a PR between the RSU and a satellite, an estimation of a position of the satellite based on EPH data or ALM data of the satellite, or an estimation of a clock offset associated with the satellite based on the EPH data or the ALM data of the satellite; transmit at least one of the measurement of the PR, the estimation of the position of the satellite, or the estimation of the clock offset for the satellite to a network entity; and receive information associated with the satellite from the network entity based on the measurement of the PR, the estimation of the position of the satellite, or the estimation of the clock offset (e.g., via the SV measurement component 198).

Figure 2:
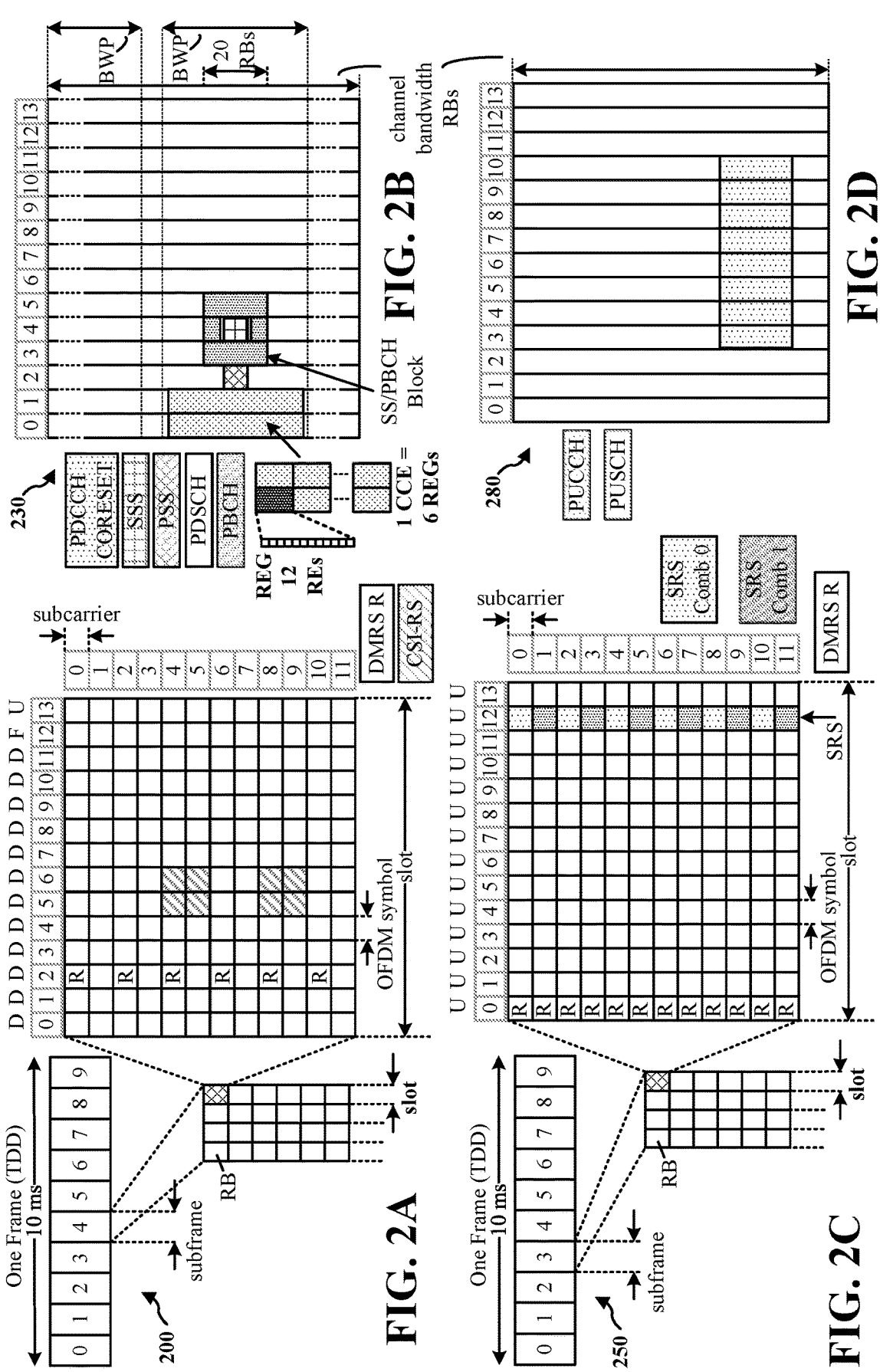
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15[\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu \ast 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
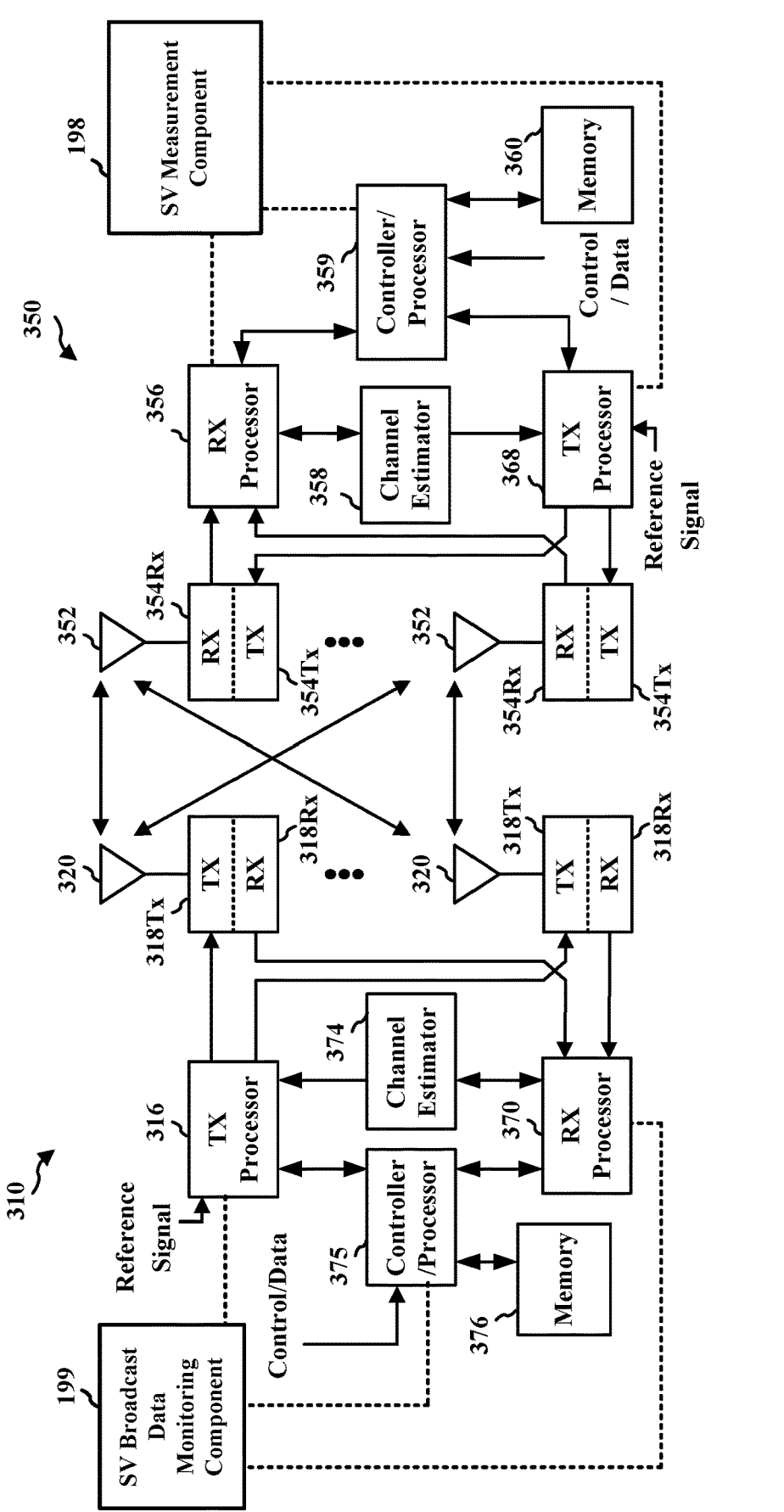
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SV measurement component 198 of FIG. 1.

At least one of the TX processor 316, the RX processor 370, and the controller/processor 375 may be configured to perform aspects in connection with the SV broadcast data monitoring component 199 of FIG. 1.

Figure 4:
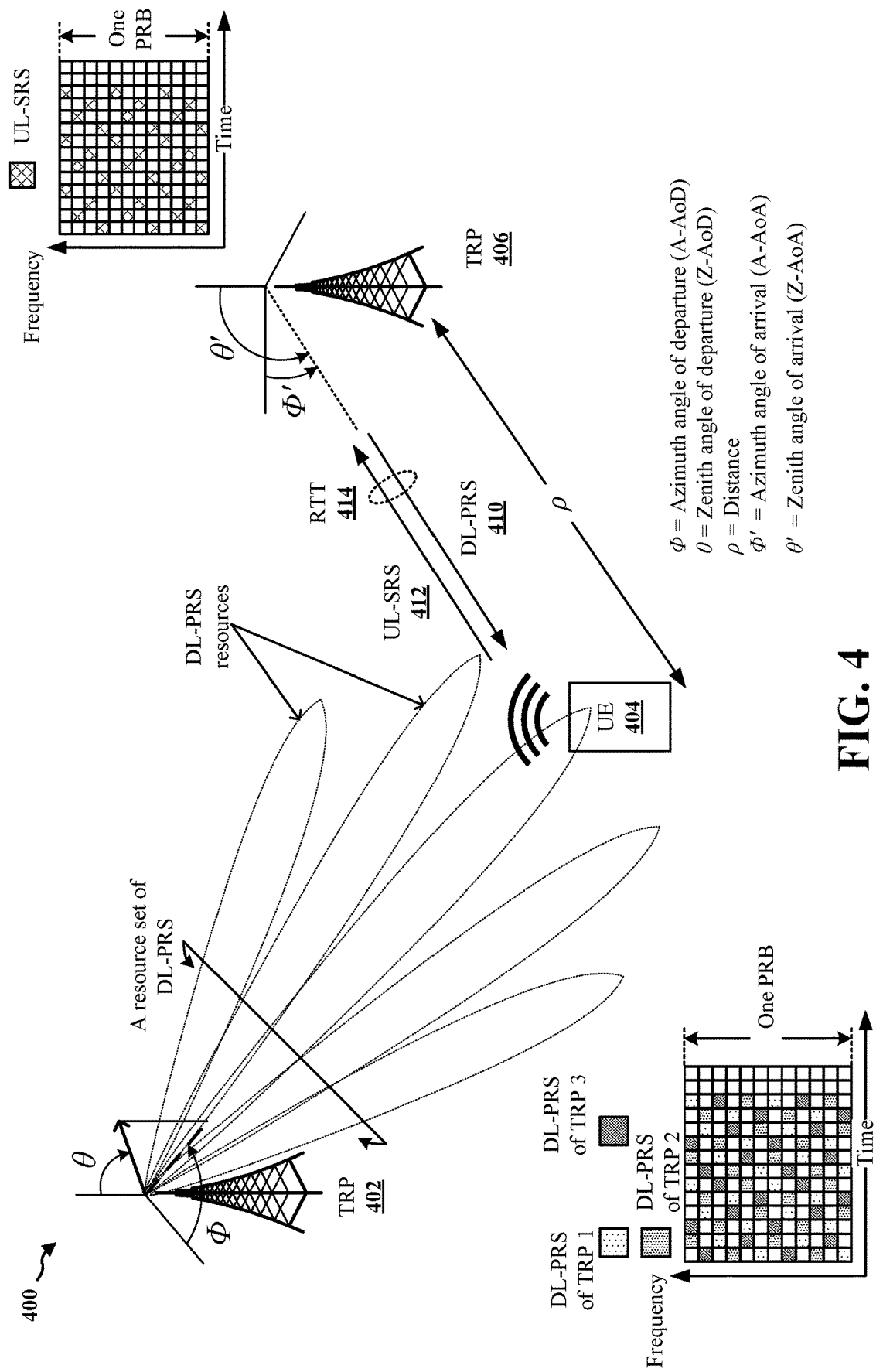
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

A device (e.g., a UE) equipped with a global navigation satellite system (GNSS) receiver (which may include the Global Positioning System (GPS) receiver) may determine its location based on GNSS positioning. GNSS is a network of satellites broadcasting timing and orbital information used for navigation and positioning measurements. GNSS may include multiple groups of satellites, known as constellations, that broadcast signals (which may be referred to as GNSS signals) to control stations and users of the GNSS. Based on the broadcast signals, the users may be able to determine their locations (e.g., via trilateration process). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
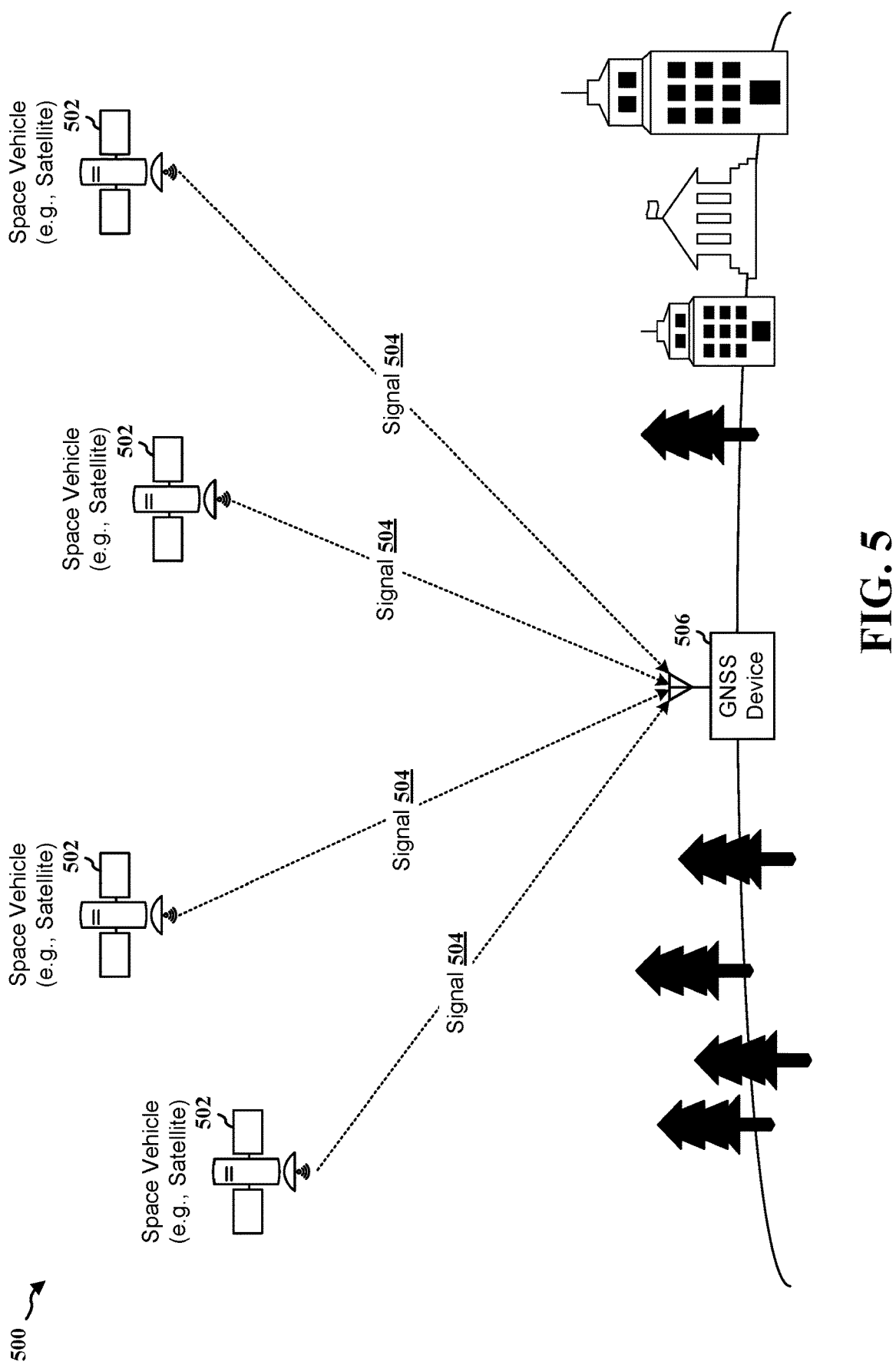
FIG. 5 is a diagram illustrating an example of global navigation satellite system (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for each SV 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from each SV 502, the GNSS device 506 may measure the time of arrivals (TOAs) of the GNSS signals 504 and calculate the time of flights (TOFs) for the GNSS signals 504. Then, based on the TOFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned. The accuracy of GNSS based positioning may depend on various factors, such as satellite geometry, signal blockage, atmospheric conditions, and/or receiver design features/quality, etc. For example, GNSS receivers used by smartphones or smart watches may have lower accuracy compared to GNSS receivers used by vehicles and surveying equipments.

Being able to receive GNSS signals or GNSS SV broadcast data continuously without interruption may be important for certain applications. For example, vehicle-to-everything (V2X) and cellular V2X (C-V2X) applications are associated with communications between a vehicle and any entity that may affect, or may be affected by, the vehicle and/or associated with self-driving vehicles (which may also be referred to as autonomous cars, driver-less cars, and/or robotic cars), where one goal/motivation of the V2X/C-V2X applications is to improve road safety, traffic efficiency, energy savings, and mass surveillance, etc. As such, real time GNSS satellite broadcast data may be important to ensure continuity and/or availability of position/time information for V2X/C-V2X applications.

In some scenarios, data broadcast from a GNSS SV may contain error(s) (hereafter "satellite error(s)" or "broadcast data error(s)"), which may affect the positioning accuracy of a GNSS device. For purposes of the present disclosure, an error associated with an SV, such as the broadcast data error, may refer to a cause that contributes to a loss of precision in the calculation of a GNSS device's position. This may include errors that affect the time signal broadcast from an SV and errors that affect the estimated position of an SV in the space. For example, satellite error(s) or broadcast data error(s) may include satellite clock errors, ephemeris errors (e.g., each SV may broadcast ephemeris data that describes its orbit), errors associated with hardware components, atmospheric errors, and/or multipath errors, etc.

Satellite error(s) and/or broadcast data error(s) may be detected via various error detection mechanisms (e.g., by a GNSS device or a positioning entity). For example, GNSS SVs may be configured to provide their ephemeris, almanac, and/or health information, and a GNSS device or a position entity may decode these information over-the-air (OTA) and determine whether there are errors associated with an SV. Ephemeris information of an SV may be used to calculate the position of an SV in orbit, and almanac information may be used for determining the availability and status of a satellite constellation (e.g., an entire satellite constellation), etc. For example, GNSS almanacs and ephemerides both may form a navigation message transmitted by a satellite. The ephemerides may contain information on week number, satellite accuracy and health, age of data, satellite clock correction coefficients, orbital parameters, etc. In some examples, the ephemerides may be valid two hours before and two hours after time of ephemeris (toe). The toe may be thought of as when the data was computed from the GNSS control segment. The ephemerides may be used for real time satellite coordinate computation. On the other hand, the almanac may contain less accurate orbital information than ephemerides. In some examples, the almanac may be valid for a period of up to ninety (90) days.

However, as GNSS SVs may be configured to update their ephemeris, almanac, and/or health information periodically (e.g., every X hours), their actual/current status may not be reflected after few hours.

In another example, a GNSS device or a positioning entity may use satellite-based augmentation system (SBAS) based integrity information for identifying whether there is an error associated with an SV. SBAS is a highly accurate and reliable navigation satellite system that is capable of augmenting GNSS system. For example, current GNSS systems give may provide users with a positioning accuracy of 5 to 15 meters. However, SBAS and precise point positioning (PPP) systems may provide integrity and correction information to users to improve the positioning accuracy (e.g., to a meter-level and/or decimeter-level (e.g., 10 to 15 cm) accuracy). However, this integrity and correction information may be limited to GPS/GNSS SVs. In addition, decoding SBAS based integrity and correction information may not be available in a challenging or dense urban environment.

In another example, a GNSS device or a positioning entity may determine whether there is an error associated with an SV based on receiver autonomous integrity monitoring (RAIM). RAIM is a technology that is developed to assess the integrity of GPS signals in a GPS receiver system. For example, as a GPS SV may not include any internal information about the integrity of its signals, the GPS SV may broadcast incorrect information that will cause navigation information to be incorrect, and the GPS device may not be aware of such incorrect information. RAIM uses redundant signals to produce several GPS position fixes and compare them, and a statistical function determines whether or not a fault is associated with any of the signals. However, using RAIM for error detection may specify greater computational complexity and may have combinatorial problems. For example, RAIM may not help if an SV is not usable in the positioning of a GNSS device but is broadcasting incorrect information/data.

In other examples, a GNSS device or a positioning entity may determine whether there is an error associated with an SV based on integrity information provided by another entity. However, the GNSS device of the positioning entity may be specified to request the another entity for the integrity file, and the download resolutions for the integrity file may be 4 h, 6 h, 12 h, and/or 24 h, etc.

As such, a real time (or a near real time) SV broadcast data monitoring that is capable of identifying one or more errors associated with information/data broadcasted from an SV may have an immense benefit in preventing a GNSS outage. The GNSS outage may refer to a GNSS device unable to receive GNSS signals/information from one or more SVs or is unable to performing positioning based on the GNSS signals/information received (e.g., due to error(s) or in the presence of SV health issues, etc.). Such real time (or a near real time) SV broadcast data monitoring may also benefit applications that specify receiving GNSS signals and broadcast data continuously without interruption, such as V2X/C-V2X applications.

Aspects presented herein may enable a GNSS device (e.g., a UE, a GNSS receiver, etc.) or a positioning entity (e.g., a location server, an LMF, a network node, a base station, etc.) to determine whether there are any errors in data broadcasted from one or more SVs to ensure the continuity and the availability of accurate position and/or time information is received by the GNSS device or the positioning entity, which may be suitable for V2X/C-V2X applications. For example, in one aspect of the present disclosure, a network (e.g., a set) of road-side units (RSUs) may be used for estimating the position and/or the clock offset of an SV. A clock offset may refer to a difference between two clocks at any given instant, and the rate at which the clocks are drifting may be referred to as the clock drift. IN some scenarios, a satellite's clock may include a clock offset (which may also be referred to as a clock error), which may be caused by the satellite oscillator not being synchronized to a GPS time and it is one of the main errors which may affect the positioning accuracy. As the position of an RSU is typically known (e.g., an RSU may be similar to a beacon with a known position and clock), the range between a particular SV and the network of RSUs may be measured and used for estimating the position of the SV. Then, the estimated position of the SV may be compared with the ephemeris information and/or the almanac information broadcasted from the SV (or received from another entity) to determine whether there is an error associated with the SV. The SV may be isolated/excluded from positioning if the SV is determined to broadcast erroneous information. This process may be repeated for multiple SVs (e.g., all SVs participating in a positioning session), thereby improving the positioning accuracy for the GNSS device. A positioning session (or a UE positioning session) may refer to an occasion/instance in which the position of a UE is to be determined, such as based on one of the positioning mechanisms described in connection with FIG. 4.

For purposes of the present disclosure, an RSU may refer to a transceiver (e.g., a dedicated short-range communications (DSRC) transceiver) that is placed along a road or a pedestrian passageway. The RSU may also include a GNSS receiver that is capable of receiving GNSS signals transmitted/broadcasted from one or more SVs. In some examples, an RSU may also be placed on a vehicle or may be hand carried, but it may operate when the vehicle or the hand-carried unit (e.g., a UE) is stationary. An RSU may broadcast data to onboard units (OBUs) of vehicles and/or exchange data with the OBUs in its communications zone (e.g., within its transmission range). An RSU may also be configured to provide channel assignments (e.g., resources allocations) and operating instructions to OBUs in its communications zone.

Figure 6:
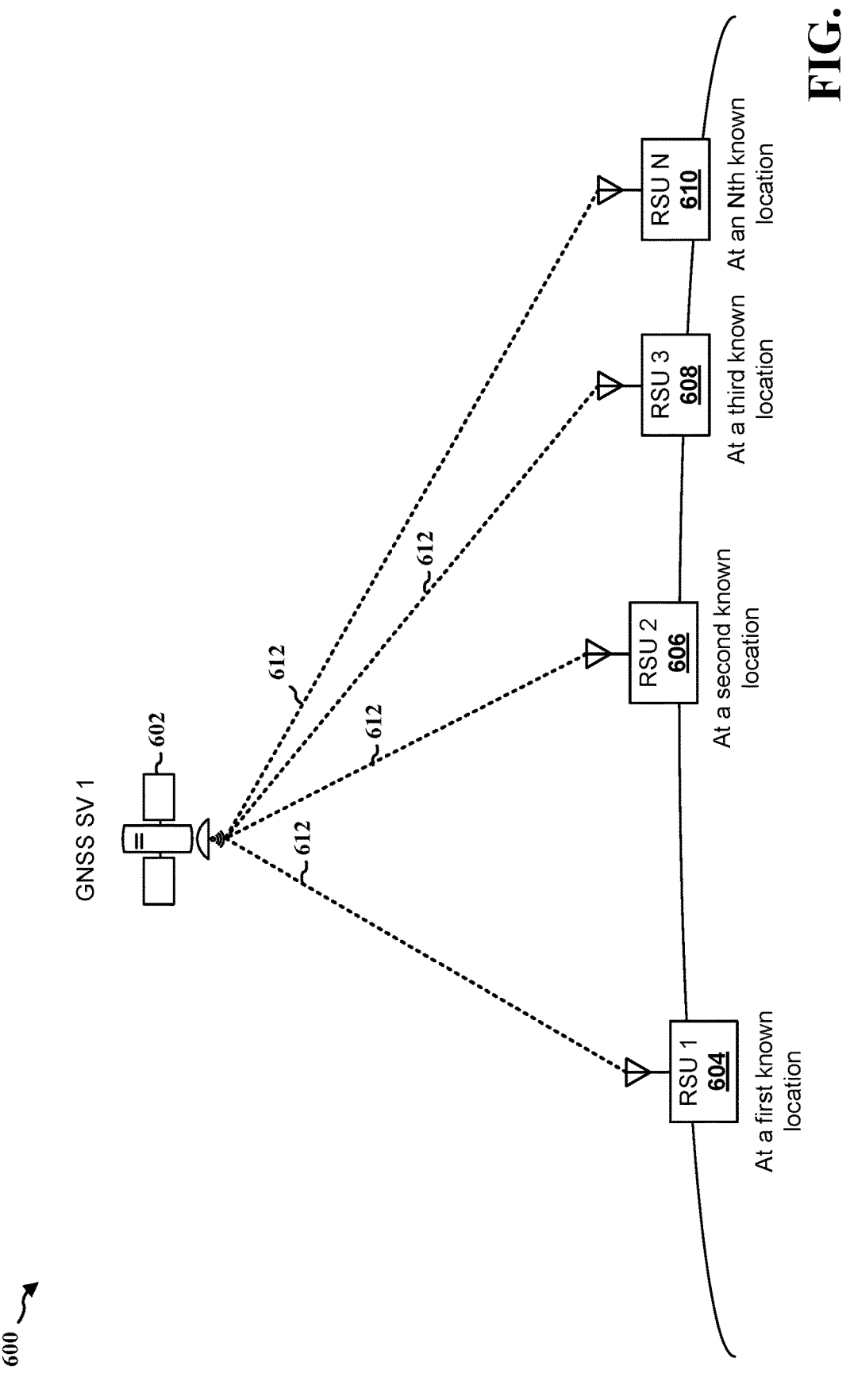
FIG. 6 is a diagram illustrating an example of estimating a position and a clock offset of a space vehicle (SV) using a network of road-side units (RSUs) in accordance with various aspects of the present disclosure.

FIG. 6 is a diagram 600 illustrating an example of estimating a position and a clock offset of an SV using a network of RSUs in accordance with various aspects of the present disclosure. In one example, a network of RSUs may include a first RSU 604 (RSU 1), a second RSU 606 (RSU 2), a third RSU 608, and up to an $N^{th}$ RSU 610 (RSU N), etc., where locations of the network of RSUs may be known.

As shown at 612, each RSU in the network of RSUs may receive GNSS signals, the ephemeris (EPH) information, and/or the almanac (ALM) information (collectively as EPH/ALM information or EPH/ALM data) transmitted from a first SV 602 (e.g., a GNSS SV). Based on the GNSS signals received, each RSU may calculate/estimate its distance (e.g., PR) from the first SV 602, such as described in connection with FIG. 5. For example, a pseudo-range (PR) (e.g., $PR_1$) between the first RSU 604 and the first SV 602 may be calculated based on:

$$PR_1 = \sqrt{\frac{(X_{RSU1} - X_{SV1})^2 + (Y_{RSU1} - Y_{SV1})^2 +}{(Z_{RSU1} - Z_{SV1})^2}} + CB_{SV1},$$

where X, Y, $Z_{RSU1}$ may indicate the earth-centered, earth-fixed (ECEF) position of the first RSU 604 (e.g., obtained based on the known location of the first RSU 604), X, Y, $Z_{SV1}$ may indicate the ECEF position of the first SV 602 (e.g., derived based on the EPH/ALM information), and $CB_{SV1}$ may indicate the clock offset associated with the first SV 602 (clock bias at the first RSU 604 may be fully compensated). A PR may refer to a pseudo distance between an SV and a GNSS receiver. For a GNSS receiver to determine its position, as described in connection with FIG. 5, the GNSS receiver may determine its ranges to four SVs as well as their positions at time of transmitting. Knowing the SVs' orbital parameters, these positions may be calculated for any point in time. The PRs of each SV may be obtained by multiplying the speed of light by the time the signal has taken from the SV to the GNSS receiver. As there may be accuracy errors in the time measured, the term PRs is used for such distances. Similarly, the PR (e.g., $PR_2$) between the second RSU 606 and the first SV 602 may be calculated based on:

$$PR_2 = \sqrt{\frac{(X_{RSU2} - X_{SV1})^2 + (Y_{RSU2} - Y_{SV1})^2 +}{(Z_{RSU1} - Z_{SV1})^2}} + CB_{SV1},$$

where X, Y, $Z_{RSU2}$ may indicate the ECEF position of the second RSU 606 (e.g., obtained based on the known location of the second RSU 606), and the PR (e.g., PRN) between the $N^{th}$ RSU 610 and the first SV 602 may be calculated based on:

$$PR_N = \sqrt{\frac{(X_{RSUN} - X_{SV1})^2 + (Y_{RSUN} - Y_{SV1})^2 +}{(Z_{RSUN} - Z_{SV1})^2}} + CB_{SV1},$$

where X, Y, $Z_{RSUN}$ may indicate the ECEF position of the $N^{th}$ RSU 610 (e.g., obtained based on the known location of the $N^{th}$ RSU 610), etc. This process may repeat for a plurality of SVs, such as up to Kth SVs.

Based on the PR calculated/estimated at each RSU, the position of the first SV 602 may be determined. For example, the position of the first SV 602 may be determined based on a trilateration process using known distances from at least three points with known locations (e.g., using PRs calculated by at least four RSUs with their known locations). As such, a minimum of four RSUs may be specified to determine the position of the first SV 602. In addition, the accuracy of the SV position estimate may also be improved if the network of RSUs are spread across a wide geographic area and/or from multiple directions.

In another aspect of the present disclosure, a network entity, such as a cloud server, may be configured to control and/or coordinate the network of RSUs (e.g., the first RSU 604, the second RSU 606, . . . , up to the $N^{th}$ RSU 610, etc.), and the network entity may collect/sample data and measurements from the network of RSUs (which may also be referred to as performing crowd-sourcing for the data and measurements from the network of RSUs). For example, the network entity may obtain, from the network of RSUs, at least one of: their ECEF positions (e.g., $X_{RSU}$, $Y_{RSU}$, $Z_{RSU}$), their estimated PRs with respect to one or more SVs (e.g., the SV 602), the SV position and clock offset computed from the EPH data associated with the SV (e.g., $(X_{SV}, Y_{SV}, Z_{SV})_{EPH}$ and $CB_{SV_{EPH}}$), and/or the SV position and clock offset computed from ALM data associated with the SV (e.g., $(X_{SV}, Y_{SV}, Z_{SV})_{ALM}$, $CB_{SV_{ALM}}$), etc. Note that the EPH data and/or the ALM data may not be available for some SVs, or may be received from another entity other than the SV itself (e.g., the SV may not have the capability to broadcast it).

After the network entity collects these data and measurements from the network of RSUs, the network entity may process these data and measurements, and use these sampled data and measurements from different RSUs to estimate the positions and clock offsets of one or more SVs (e.g., estimated at the cloud server). Then, based on the data and measurements collected/sampled from various RSUs, the network entity may be configured to find the difference in the network entity/cloud server estimated SV position and the SV position computed by each RSU (e.g., based on the SV's broadcast data/information, such as the EPH/ALM information). In one example, as the network entity may be aware of the positions of the RSUs, the network entity may also select the RSUs for determining the position of an SV based on their locations. For example, as the accuracy of the SV position estimate may be improved if the RSUs used for estimating the position of the SV are spread across a wide geographic area and/or from multiple directions, the network entity may select RSUs that are at least a distance apart from each other, and/or RSUs that are from different directions/regions, etc.

The network entity may perform a statistical analysis for the SV positions computed by the network entity and the network of RSUs, and the network entity may determine outliers and/or effective user equivalent range error (UERE) (e.g., the ranging error between an SV and an RSU) for modeling the broadcast data errors. Then, the network entity may share these data and information (e.g., the determined broadcast data error) with the RSUs and/or one or more end users (e.g., a UE or a GNSS device that is performing GNSS-based positioning). For V2X/C-V2X applications, the RSUs may also communicate these data and information to a set of users (e.g., OBUs of vehicles) through V2X/C-V2X protocols. The network entity may perform the crowd-sourcing of the data and information from the network of RSUs periodically to provide real time (or near real time) broadcast data health monitoring for a set of SVs. In another example, the network entity may also perform the crowd-sourcing of the data and information from the network of RSUs on-demand, where the network entity may send/initiate one or more requests to the network of RSUs and request the network of RSUs to provide the data and information associated with a set of SVs. In response, the network of RSUs may provide the data and information associated with the set of SVs based on the one or more requests. The on-demand configuration may reduce power consumption and signaling overhead between the network entity and the network of RSUs.

In one example, based on the broadcast data health monitoring, the network entity may associated/assign each SV or an SV used in a positioning session with a scale factor (e.g., a scale from 1 to 10), a weight factor (e.g., a percentage), or a quality indication (e.g., good, bad, acceptable, etc.). For example, an SV with accurate broadcast data may be given a higher scale factor, a higher weight factor, and/or a good quality indication, whereas an SV with inaccurate broadcast data may be given a lower scale factor, a lower weight factor, and/or a bad quality indication in comparison. Then, this weight/scale factor and/or quality indication may be used by one or more positioning entities during a positioning session.

For example, the network entity may communicate the scale factors, the weight factors, and/or the quality indications associated with a set of SVs to end users, such as UEs and GNSS receivers that are performing GNSS-based positioning. In response, these UEs/GNSS receivers may determine whether to use a particular SV for positioning, and/or the weight given to a particular SV for positioning. For example, if a UE/GNSS receiver receives an indication that a particular satellite has a low scale factor, a low weight, or a bad quality indication, the UE/GNSS receiver may exclude this SV from its positioning (or exclude/ignore measurements obtained based on this SV).

FIG. 7 is a communication flow 700 illustrating an example of a network entity (e.g., a cloud server) providing GNSS broadcast data quality monitoring for a set of SVs based on crowd-sourced data from a network of RSUs in accordance with various aspects of the present disclosure. The numberings associated with the communication flow 700 do not specify a particular temporal order and are merely used as references for the communication flow 700.

In one example, a network entity 710 (e.g., a cloud server, a location server, a base station, or an RSU in the plurality of RSUs, etc.) may control or coordinate a plurality of RSUs to obtain measurements for one or more SVs (which may also be referred to as satellites). For example, the network entity 710 may select a network of RSUs 704 that includes a first RSU 706 and up to an N$^{th}$ RSU 708 to perform measurements for an SV 702. The measurements may include measuring the PR between the RSU and the SV 702, estimating the position of the SV 702, and/or estimating the clock offset associated with the SV 702, etc. (collectively as "SV measurements"). In some examples, the locations of the network of RSUs 704 may be known to the network entity 710. For example, the network of RSUs 704 may indicate their ECEF locations to the network entity 710, or the network entity 710 may have an access to a database that includes the locations of the network of RSUs 704, etc. In other examples, the locations of the network of RSUs 704 may not be known to the network entity 710, and RSU(s) in the network of RSUs 704 may be configured to indicate their locations to the network entity 710 (e.g., such as upon request). For example, the network of RSUs 704 may indicate their ECEF locations to the network entity 710, or the network entity 710 may have an access to a database that includes the locations of the network of RSUs 704, etc.

In some examples, to improve the accuracy of SV positioning, the network entity 710 may also select the network of RSUs 704 based on their locations, based on the distance between two RSUs, and/or based on their directions with respect to one or more SVs, etc. In some examples, the SV 702 may be a GNSS satellite, a low earth orbit (LEO) satellite, a medium earth orbit (MEO) satellite, a geosynchronous (GEO) satellites, or a high-altitude pseudo satellite (HAPS).

At 720, each RSU in the network of RSUs 704 may receive and measure GNSS signals and/or EPH/ALM data (if available) transmitted from the SV 702. Then, at 722, each RSU may measure the PR between it and the SV 702, and/or estimate the position of the SV 702 and/or the clock offset associated with the SV 702 based on the EPH/ALM data of the SV 702. For example, the first RSU 706 may calculate the PR between the first RSU 706 and the SV 702, the SV 702 position and clock offset computed from the EPH data of the SV 702 (e.g., $(X_{SV}, Y_{SV}, Z_{SV})_{EPH}$ and $CB_{SV_{EPH}}$), and/or the SV 702 position and clock offset computed from the ALM data (e.g., $(X_{SV}, Y_{SV}, Z_{SV})_{ALM}$ and $CB_{SV_{ALM}}$), such as described in connection with FIG. 6.

At 724, the network of RSUs 704 may transmit their SV measurements for the SV 702 (e.g., the corresponding PR, position, and/or clock offsets of the SV 702) to the network entity 710. In some examples, the network entity 710 may be configured to collect/sample these SV measurements based on a crowd-sourcing mechanism (e.g., based on receiving SV measurements as crowd-sourced information from the network of RSUs 704). Crowd-sourcing may refer to obtaining information or data from a group of entities who submit their data to a server. If the network entity 710 does not have the locations of the network of RSUs 704, the network of RSUs 704 may also provide their locations (e.g., their ECEF locations) to the network entity 710.

At 726, based on the received/collected SV measurements for the SV 702, the network entity 710 may estimate a position and/or a clock offset of the SV 702 based on these SV measurements and also based on the locations of the network of RSUs, such as described in connection with FIG. 6.

At 728, the network entity 710 may identify whether the estimated position/clock offset of the SV 702 is associated with an error based on a comparison of the estimated position/clock offset with the ALM/EPH data of the SV 702.

In one example, as shown at 730, the network entity 710 may assign a scale factor (e.g., a number), a weight factor (e.g., a percentage), or a quality indication to the SV 702 based on whether the SV 702 is associated with an error. For example, the SV 702 may be assigned with a higher scale factor, a higher weight factor, and/or a good quality indication if it is not associated with an error, whereas the SV 702 may be assigned with a lower scale factor, a lower weight factor, and/or a bad quality indication in comparison if it is associated with an error. In addition, the scale factor, the weight factor, and/or the quality indication may also differ based on the magnitude of the identified error. For example, a larger error may have a lower scale/weight factor or quality indication compared to a mild error.

Based on whether the SV 702 is associated with an error, or based on the scale factor, weight factor, and/or quality indication associated with the SV 702, if the network entity 710 is a positioning entity (e.g., a location server, an LMF, etc.), the network entity 710 may determine whether to include the SV 702 for positioning of one or more GNSS devices. For example, the network entity 710 may include the SV 702 in a positioning session of a UE if the SV 702 is not associated with an error (e.g., it is providing/broadcasting accurate SV information). On the other hand, as shown at 732, the network entity 710 may exclude the SV 702 from a UE positioning session or give it less weight in the UE positioning session if the network entity 710 identifies that the SV 702 is associated with an error (or an error exceeding an error threshold). For example, the network entity 710 may remove at least some of the ALM data or the EPH data of the SV 702 from the positioning session of the UE.

In some examples, as shown at 734, the network entity 710 may indicate to one or more RSUs in the network of RSUs 704 and/or one or more UEs 712 (e.g., end users, devices performing GNSS-based positioning, etc.) regarding whether the SV 702 is associated with an error (e.g., via an error indication). In other examples, the network entity 710 may indicate the scale factor, the weight factor, and/or the quality indication it assigned to the SV 702 to the one or more RSUs in the network of RSUs 704 and/or the one or more UEs 712.

In another example, as shown at 736, the network entity 710 may indicate the error indication (e.g., indication of whether the SV 702 is associated with an error), the scale factor, the weight factor, and/or the quality indication associated with the SV 702 to one or more RSUs in the network of RSUs 704. Then, an RSU in the network of RSUs 704 may forward the error indication, the scale factor, the weight factor, and/or the quality indication associated with the SV 702 to UEs within its transmission range, such as the one or more UEs 712.

At 738, based on the error indication, the scale factor, the weight factor, and/or the quality indication associated with the SV 702, the one or more UEs 712 may determine whether to include/exclude the SV 702 in their positioning, and/or whether to give it more/less weight in their positioning, etc.

As such, aspects presented herein may enable a network entity to monitor broadcast data quality from SVs using a set of RSUs, and to detect whether an SV is providing inaccurate information (e.g., information containing an error).

FIG. 8 is a flowchart 800 of a method of wireless communication. The method may be performed by a network entity (e.g., the base station 102; the LMF 166; the RSU 604, 606, 608, 610, 706, 708; the network entity 710, 1060). The method may enable the network entity to determine whether there are any errors in the broadcast data from one or more SVs based on crowd-sourcing information from a set of RSUs.

At 802, the network entity may obtain at least one measurement for a satellite associated with a set of RSUs, such as described in connection with FIG. 7. For example, at 724, the network entity 710 may obtain PR, position, and/or clock offset measurements associated with the SV 702 from the network of RSUs 704. The means for obtaining of the at least one measurement for a satellite may be performed by, e.g., the SV broadcast data monitoring component 199, the network processor 1012, and/or the network interface 1080 of the network entity 1060 in FIG. 10.

In one example, to obtain the at least one measurement for the satellite associated with the set of RSUs, the network entity may receive the at least one measurement for the satellite from the set of RSUs. In such an example, the at least one measurement for the satellite is received from the set of RSUs periodically or on-demand (e.g., based on one or more requests initiated by network entity).

In another example, the at least one measurement include at least one of: a PR between each RSU in the set of RSUs and the satellite, the estimated position of the satellite computed at each RSU in the set of RSUs based on the ALM data or the EPH data of the satellite, or a clock offset associated with the satellite computed at each RSU in the set of RSUs based on the ALM data or the EPH data of the satellite.

In another example, the network entity may receive a location of each of the set of RSUs from the set of RSUs. In some implementation, the locations of the set of RSUs may correspond to ECEF locations of the set of RSUs.

In another example, the network entity may select the set of RSUs for obtaining the at least one measurement for the satellite based on the location of each of the set of RSUs.

In another example, the set of RSUs includes at least four RSUs.

In another example, the network entity is a base station, a component of the base station, a location server, or an RSU within the set of RSUs.

In another example, the satellite is an SV, a GNSS satellite, a LEO satellite, a MEO satellite, a GEO satellites, or a HAPS.

At 804, the network entity may estimate a position of the satellite based on the at least one measurement and locations of the set of RSUs, such as described in connection with FIG. 7. For example, at 726, the network entity 710 may estimate a position and/or a clock offset of the SV 702 based on PRs, positions, and/or clock offsets measured by the network of RSUs 704 and their locations. The means for estimating the position of the satellite may be performed by, e.g., the SV broadcast data monitoring component 199, the network processor 1012, and/or the network interface 1080 of the network entity 1060 in FIG. 10.

At 806, the network entity may identify whether the estimated position of the satellite is associated with an error based on a comparison of the estimated position of the satellite with ALM data or EPH data of the satellite, such as described in connection with FIG. 7. For example, at 728, the network entity 710 may identify whether the estimated position and/or clock offset of the SV 702 is associated with an error by comparing the estimated position with ALM/EPH data of the SV 702. The means for identifying whether the estimated position of the satellite is associated with an error may be performed by, e.g., the SV broadcast data monitoring component 199, the network processor 1012, and/or the network interface 1080 of the network entity 1060 in FIG. 10.

In one example, to identify whether the estimated position of the satellite is associated with an error, the network entity may estimate a clock offset associated with the satellite, where the error associated with the estimated position of the satellite may be further based on the estimated clock offset, such as described in connection with FIG. 7. For example, at 726, the network entity 710 may estimate a position and/or a clock offset of the SV 702 based on PRs, positions, and/or clock offsets measured by the network of RSUs 704 and their locations. The estimation of the clock offset of the satellite may be performed by, e.g., the SV broadcast data monitoring component 199, the network processor 1012, and/or the network interface 1080 of the network entity 1060 in FIG. 10.

At 808, the network entity may include the satellite in a positioning session of a UE in response to the estimated position of the satellite being associated with the error, where the satellite is included in the positioning session with a scale factor, a weight factor, or a quality indication, and/or the network entity may exclude the satellite from a positioning session of a UE in response to the estimated position of the satellite being associated with the error, such as described in connection with FIG. 7. For example, at 730, the network entity 710 may assign a scale factor, a weight factor, or a quality indication for the SV 702 based on whether the SV 702 is associated with an error, where such scale factor, weight factor, and/or quality indication may be used for UE positioning. At 732, the network entity 710 may exclude the SV 702 from a UE positioning session or give it less weight in the UE positioning session if it is associated with an error. The means for including or the means for excluding the satellite in or from a positioning session of a UE may be performed by, e.g., the SV broadcast data monitoring component 199, the network processor 1012, and/or the network interface 1080 of the network entity 1060 in FIG.

At 812, the network entity may exclude the satellite from a positioning session of a UE in response to the estimated position of the satellite being associated with the error, such as described in connection with FIG. 7. For example, at 732, the network entity 710 may exclude the SV 702 from a UE positioning session or give it less weight in the UE positioning session if it is associated with an error. The exclusion of the satellite from a positioning session of a UE may be performed by, e.g., the SV broadcast data monitoring component 199, the network processor 1012, and/or the network interface 1080 of the network entity 1060 in FIG. 10.

In one example, to exclude the satellite from the positioning session of the UE, the network entity may remove at least some of the ALM data or the EPH data of the satellite from the positioning session of the UE At 810, the network entity may transmit an indication of the error to at least one RSU in the set of RSUs or to at least one UE, such as described in connection with FIG. 7. For example, at 734, the network entity 710 may transmit an error indication to one or more RSUs in the network of RSUs 704 and/or the one or more UEs 712. The transmission of the indication may be performed by, e.g., the SV broadcast data monitoring component 199, the network processor 1012, and/or the network interface 1080 of the network entity 1060 in FIG. 10.

FIG. 9 is a flowchart 900 of a method of wireless communication. The method may be performed by a network entity (e.g., the base station 102; the LMF 166; the RSU 604, 606, 608, 610, 706, 708; the network entity 710, 1060). The method may enable the network entity to determine whether there are any errors in the broadcast data from one or more SVs based on crowd-sourcing information from a set of RSUs.

At 902, the network entity may obtain at least one measurement for a satellite associated with a set of RSUs, such as described in connection with FIG. 7. For example, at 724, the network entity 710 may obtain PR, position, and/or clock offset measurements associated with the SV 702 from the network of RSUs 704. The means for obtaining of the at least one measurement for a satellite may be performed by, e.g., the SV broadcast data monitoring component 199, the network processor 1012, and/or the network interface 1080 of the network entity 1060 in FIG. 10.

In one example, to obtain the at least one measurement for the satellite associated with the set of RSUs, the network entity may receive the at least one measurement for the satellite from the set of RSUs. In such an example, the at least one measurement for the satellite is received from the set of RSUs periodically or on-demand.

In another example, the at least one measurement include at least one of: a PR between each RSU in the set of RSUs and the satellite, the estimated position of the satellite computed at each RSU in the set of RSUs based on the ALM data or the EPH data of the satellite, or a clock offset associated with the satellite computed at each RSU in the set of RSUs based on the ALM data or the EPH data of the satellite.

In another example, the network entity may receive a location of each of the set of RSUs from the set of RSUs. In some implementations, the locations of the set of RSUs may correspond to ECEF locations of the set of RSUs.

In another example, the network entity may select the set of RSUs for obtaining the at least one measurement for the satellite based on the location of each of the set of RSUs.

In another example, the set of RSUs includes at least four RSUs.

In another example, the network entity is a base station, a component of the base station, a location server, or an RSU within the set of RSUs.

In another example, the satellite is an SV, a GNSS satellite, a LEO satellite, a MEO satellite, a GEO satellites, or a HAPS.

At 904, the network entity may estimate a position of the satellite based on the at least one measurement and locations of the set of RSUs, such as described in connection with FIG. 7. For example, at 726, the network entity 710 may estimate a position and/or a clock offset of the SV 702 based on PRs, positions, and/or clock offsets measured by the network of RSUs 704 and their locations. The means for estimating the position of the satellite may be performed by, e.g., the SV broadcast data monitoring component 199, the network processor 1012, and/or the network interface 1080 of the network entity 1060 in FIG. 10.

At 906, the network entity may identify whether the estimated position of the satellite is associated with an error based on a comparison of the estimated position of the satellite with ALM data or EPH data of the satellite, such as described in connection with FIG. 7. For example, at 728, the network entity 710 may identify whether the estimated position and/or clock offset of the SV 702 is associated with an error by comparing the estimated position with ALM/ EPH data of the SV 702. The means for identifying whether the estimated position of the satellite is associated with an error may be performed by, e.g., the SV broadcast data monitoring component 199, the network processor 1012, and/or the network interface 1080 of the network entity 1060 in FIG. 10.

In one example, to identify whether the estimated position of the satellite is associated with an error, the network entity may estimate a clock offset associated with the satellite, where the error associated with the estimated position of the satellite is further based on the estimated clock offset, such as described in connection with FIG. 7. For example, at 726, the network entity 710 may estimate a position and/or a clock offset of the SV 702 based on PRs, positions, and/or clock offsets measured by the network of RSUs 704 and their locations. The estimation of the clock offset of the satellite may be performed by, e.g., the SV broadcast data monitoring component 199, the network processor 1012, and/or the network interface 1080 of the network entity 1060 in FIG. 10.

In another example, the network entity may include the satellite in a positioning session of a UE in response to the estimated position of the satellite being associated with the error, where the satellite is included in the positioning session with a scale factor, a weight factor, or a quality indication, and/or the network entity may exclude the satellite from a positioning session of a UE in response to the estimated position of the satellite being associated with the error, such as described in connection with FIG. 7. For example, at 730, the network entity 710 may assign a scale factor, a weight factor, or a quality indication for the SV 702 based on whether the SV 702 is associated with an error, where such scale factor, weight factor, and/or quality indication may be used for UE positioning. At 732, the network entity 710 may exclude the SV 702 from a UE positioning session or give it less weight in the UE positioning session if it is associated with an error. The means for including or the means for excluding the satellite in or from a UE may be performed by, e.g., the SV broadcast data monitoring component 199, the network processor 1012, and/or the network interface 1080 of the network entity 1060 in FIG. 10.

In another example, the network entity may exclude the satellite from a positioning session of a UE in response to the estimated position of the satellite being associated with the error, such as described in connection with FIG. 7. For example, at 732, the network entity 710 may exclude the SV 702 from a UE positioning session or give it less weight in the UE positioning session if it is associated with an error. The exclusion of the satellite from a positioning session of a UE may be performed by, e.g., the SV broadcast data monitoring component 199, the network processor 1012, and/or the network interface 1080 of the network entity 1060 in FIG. 10.

In another example, to exclude the satellite from the positioning session of the UE, the network entity may remove at least some of the ALM data or the EPH data of the satellite from the positioning session of the UE In another example, the network entity may transmit an indication of the error to at least one RSU in the set of RSUs or to at least one UE, such as described in connection with FIG. 7. For example, at 734, the network entity 710 may transmit an error indication to one or more RSUs in the network of RSUs 704 and/or the one or more UEs 712. The transmission of the indication may be performed by, e.g., the SV broadcast data monitoring component 199, the network processor 1012, and/or the network interface 1080 of the network entity 1060 in FIG. 10.

Figure 10:
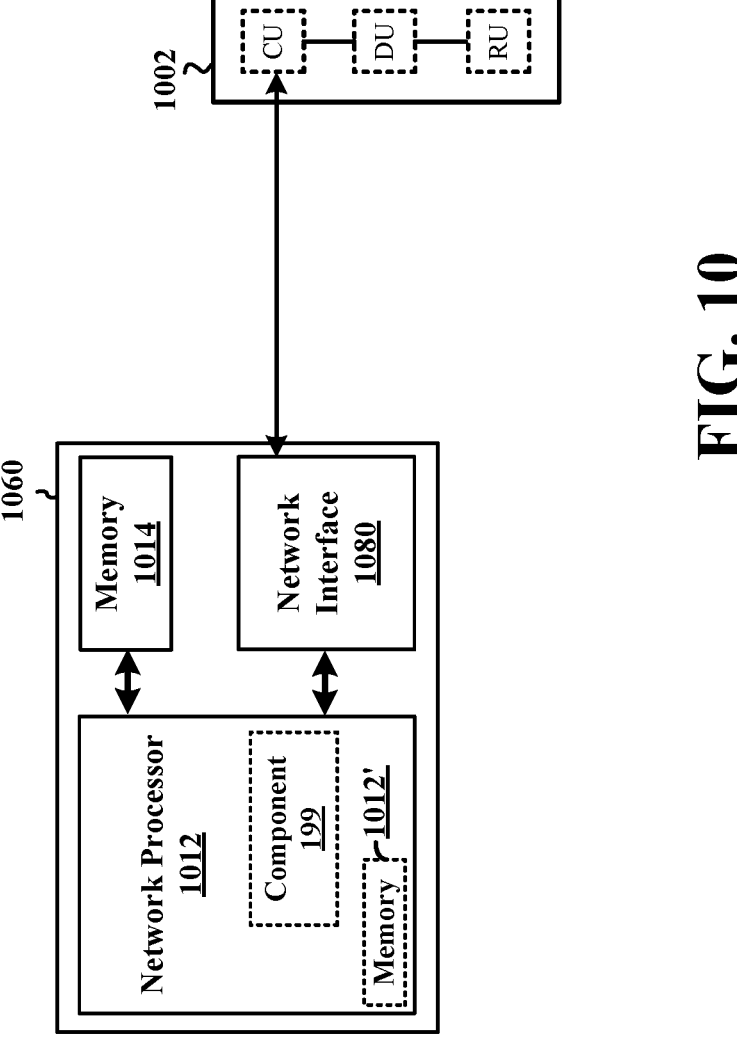
FIG. 10 is a diagram illustrating an example of a hardware implementation for a network entity.

FIG. 10 is a diagram 1000 illustrating an example of a hardware implementation for a network entity 1060. In one example, the network entity 1060 may be within the core network 120. The network entity 1060 may include a network processor 1012. The network processor 1012 may include on-chip memory 1012'. In some aspects, the network entity 1060 may further include additional memory modules 1014. The network entity 1060 communicates via the network interface 1080 directly (e.g., backhaul link) or indirectly (e.g., through a RIC) with the CU 1002. The on-chip memory 1012' and the additional memory modules 1014 may each be considered a computer-readable medium/ memory. Each computer-readable medium/memory may be non-transitory. The processor 1012 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the SV broadcast data monitoring component 199 is configured to obtain at least one measurement for a satellite associated with a set of RSUs. The SV broadcast data monitoring component 199 may also be configured to estimate a position of the satellite based on the at least one measurement and locations of the set of RSUs. The SV broadcast data monitoring component 199 may also be configured to identify whether the estimated position of the satellite is associated with an error based on a comparison of the estimated position of the satellite with ALM data or EPH data of the satellite. The SV broadcast data monitoring component 199 may be within the processor 1012. The SV broadcast data monitoring component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1060 may include a variety of components configured for various functions. In one configuration, the network entity 1060 includes means for obtaining at least one measurement for a satellite associated with a set of RSUs. The network entity 1060 may further include means for estimating a position of the satellite based on the at least one measurement and locations of the set of RSUs. The network entity 1060 may further include means for identifying whether the estimated position of the satellite is associated with an error based on a comparison of the estimated position of the satellite with ALM data or EPH data of the satellite.

In one configuration, means for obtaining the at least one measurement for the satellite associated with the set of RSUs includes configuring the network entity 1060 to receive the at least one measurement for the satellite from the set of RSUs. In such a configuration, the at least one measurement for the satellite is received from the set of RSUs periodically or on-demand.

In another configuration, the at least one measurement include at least one of: a PR between each RSU in the set of RSUs and the satellite, the estimated position of the satellite computed at each RSU in the set of RSUs based on the ALM data or the EPH data of the satellite, or a clock offset associated with the satellite computed at each RSU in the set of RSUs based on the ALM data or the EPH data of the satellite.

In another configuration, the network entity 1060 may further include means for receiving a location of each of the set of RSUs from the set of RSUs, where the locations correspond to ECEF locations of the set of RSUs.

In another configuration, the network entity 1060 may further include means for selecting the set of RSUs for obtaining the at least one measurement for the satellite based on the location of each of the set of RSUs.

In another configuration, the set of RSUs includes at least four RSUs.

In another configuration, the network entity is a base station, a component of the base station, a location server, or an RSU within the set of RSUs.

In another configuration, the satellite is an SV, a GNSS satellite, a LEO satellite, a MEO satellite, a GEO satellites, or a HAPS.

In another configuration, the network entity 1060 may further include means for estimating a clock offset associated with the satellite, where the error associated with the estimated position of the satellite is further based on the estimated clock offset.

In another configuration, the network entity 1060 may further include means for including the satellite in a positioning session of a UE in response to the estimated position of the satellite being associated with the error, where the satellite is included in the positioning session with a scale factor, a weight factor, or a quality indication.

In another configuration, the network entity 1060 may further include means for excluding the satellite from a positioning session of a UE in response to the estimated position of the satellite being associated with the error.

In another configuration, the means for excluding the satellite from the positioning session of the UE includes configuring the network entity 1060 to remove at least some of the ALM data or the EPH data of the satellite from the positioning session of the UE.

In another configuration, the network entity 1060 may further include means for transmitting an indication of the error to at least one RSU in the set of RSUs or to at least one UE.

The means may be the SV broadcast data monitoring component 199 of the network entity 1060 configured to perform the functions recited by the means.

FIG. 11 is a flowchart 1100 of a method of wireless communication. The method may be performed by an RSU (e.g., the RSU 604, 606, 608, 610, 706, 708; the apparatus 1204). The method may enable the RSU to estimate a PR, a position, and/or a clock offset of one or more SVs (e.g., based on their EPH/ALM data), and to report these measurements to a network entity to assist the network entity monitoring the quality of the broadcast data from the one or more SVs.

At 1102, the RSU may perform at least one of: a measurement of a PR between the RSU and a satellite, an estimation of a position of the satellite based on EPH data or ALM data of the satellite, or an estimation of a clock offset associated with the satellite based on the EPH data or the ALM data of the satellite, such as described in connection with FIG. 7. For example, at 722, the first RSU 706 may estimating a PR, a position, and/or a clock offset of the SV 702, which may be based on the EPH/ALM data of the SV 702. The means for measuring the PR and/or the means for estimating the position of the satellite may be performed by, e.g., the SV measurement component 198, the application processor 1206, the cellular baseband processor 1224, and/or the transceiver(s) 1222 of the apparatus 1204 in FIG. 12.

At 1104, the RSU may transmit at least one of the measurement of the PR, the estimation of the position of the satellite, or the estimation of the clock offset for the satellite to a network entity, such as described in connection with FIG. 7. For example, at 724, the first RSU 706 may transmit the estimated PR, position, and/or clock offset of the SV 702 to the network entity 710. The means for transmitting the measurement or the estimation may be performed by, e.g., the SV measurement component 198, the application processor 1206, the cellular baseband processor 1224, and/or the transceiver(s) 1222 of the apparatus 1204 in FIG. 12.

At 1106, the RSU may receive information associated with the satellite from the network entity based on the measurement of the PR, the estimation of the position of the satellite, or the estimation of the clock offset, such as described in connection with FIG. 7. For example, at 736, the first RSU 706 may receive information associated with the SV 702 from the network entity 710 based on the measurement of the PR, the estimation of the position of the satellite, or the estimation of the clock offset. The means for receiving the information associated with the satellite may be performed by, e.g., the SV measurement component 198, the application processor 1206, the cellular baseband processor 1224, and/or the transceiver(s) 1222 of the apparatus 1204 in FIG. 12.

In one example, the information is an indication of an error, and the RSU may forward the indication of the error to at least one UE.

In another example, the RSU may transmit at least one of a scale factor, a weight factor, or a quality indication associated with the satellite to at least one UE, where at least one of the scale factor, the weight factor, or the quality indication is based on the received information.

In another example, the RSU may transmit a location of the RSU to the network entity. In some implementations, the location of the RSU may correspond to an ECEF location of the RSU. In some examples, the RSU may receive a request from the network entity to perform at least one of the measurement of the PR, the estimation of the position of the satellite, or the estimation of the clock offset for the satellite based on the transmitted location of the RSU.

In another example, the satellite is an SV, a GNSS satellite, a LEO satellite, a MEO satellite, a GEO satellites, or a HAPS.

In another example, the network entity is a base station, a component of the base station, a location server, or a second RSU.

Figure 12:
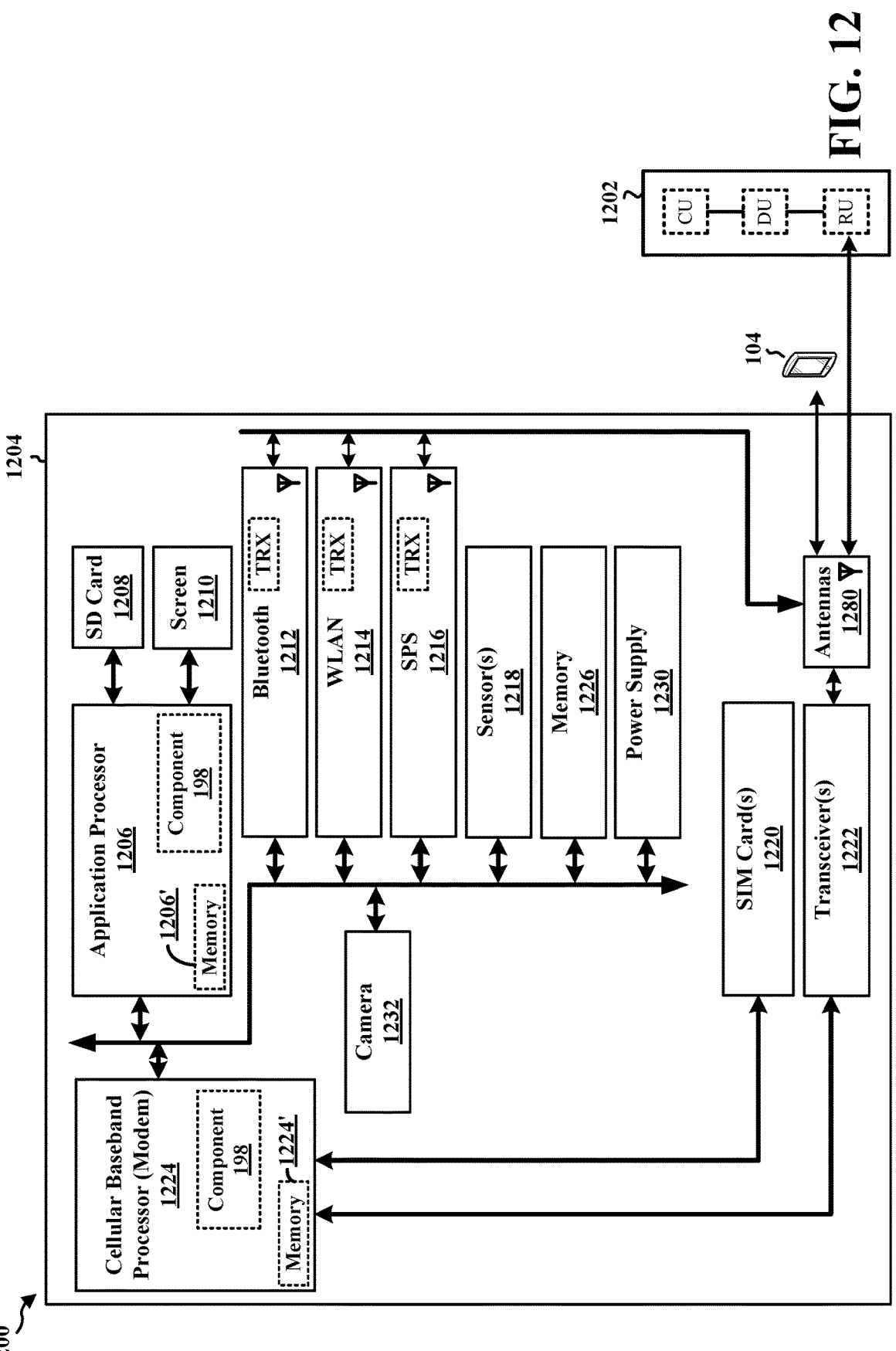
FIG. 12 is a diagram illustrating an example of a hardware implementation for an apparatus.

FIG. 12 is a diagram 1200 illustrating an example of a hardware implementation for an apparatus 1204. The apparatus 1204 may be an RSU, a component of an RSU, or may implement RSU functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., sec 350 of FIG. 3) and include the additional modules of the apparatus 1204.

As discussed supra, the SV measurement component 198 is configured to perform at least one of: a measurement of a PR between the RSU and a satellite, an estimation of a position of the satellite based on EPH data or ALM data of the satellite, or an estimation of a clock offset associated with the satellite based on the EPH data or the ALM data of the satellite. The SV measurement component 198 may also be configured to transmit at least one of the measurement of the PR, the estimation of the position of the satellite, or the estimation of the clock offset for the satellite to a network entity. The SV measurement component 198 may also be configured to receive information associated with the satellite from the network entity based on the measurement of the PR, the estimation of the position of the satellite, or the estimation of the clock offset. The SV measurement component 198 may be within the cellular baseband processor 1224, the application processor 1206, or both the cellular baseband processor 1224 and the application processor 1206. The SV measurement component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for performing at least one of: a measurement of a PR between the RSU and a satellite, an estimation of a position of the satellite based on EPH data or ALM data of the satellite, or an estimation of a clock offset associated with the satellite based on the EPH data or the ALM data of the satellite. The apparatus 1204 may further include means for transmitting at least one of the measurement of the PR, the estimation of the position of the satellite, or the estimation of the clock offset for the satellite to a network entity. The apparatus 1204 may further include means for receiving information associated with the satellite from the network entity based on the measurement of the PR, the estimation of the position of the satellite, or the estimation of the clock offset.

In one configuration, the information is an indication of an error, and the apparatus 1204 may further include means for forwarding the indication of the error to at least one UE.

In another configuration, the apparatus 1204 may further include means for transmitting at least one of a scale factor, a weight factor, or a quality indication associated with the satellite to at least one UE, where at least one of the scale factor, the weight factor, or the quality indication is based on the received information.

In another configuration, the apparatus 1204 may further include means for transmitting a location of the RSU to the network entity. In such a configuration, the apparatus 1204 may further include means for receiving a request from the network entity to perform at least one of the measurement of the PR, the estimation of the position of the satellite, or the estimation of the clock offset for the satellite based on the transmitted location of the RSU.

In another configuration, the satellite is an SV, a GNSS satellite, a LEO satellite, a MEO satellite, a GEO satellites, or a HAPS.

In another configuration, the network entity is a base station, a component of the base station, a location server, or a second RSU.

The means may be the SV measurement component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C. B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, including: obtaining at least one measurement for a satellite associated with a set of RSUs; estimating a position of the satellite based on the at least one measurement and locations of the set of RSUs; and identifying whether the estimated position of the satellite is associated with an error based on a comparison of the estimated position of the satellite with ALM data or EPH data of the satellite.

Aspect 2 is the method of aspect 1, where identifying whether the estimated position of the satellite is associated with an error includes: estimating a clock offset associated with the satellite, where the error associated with the estimated position of the satellite is further based on the estimated clock offset.

Aspect 3 is the method of aspect 1 or 2, where obtaining the at least one measurement for the satellite associated with the set of RSUs includes: receiving the at least one measurement for the satellite from the set of RSUs.

Aspect 4 is the method of aspect 3, where the at least one measurement for the satellite is received from the set of RSUs periodically or on-demand.

Aspect 5 is the method of any of aspects 1 to 4, further including: including the satellite in a positioning session of a UE in response to the estimated position of the satellite being associated with the error, where the satellite is included in the positioning session with a scale factor, a weight factor, or a quality indication.

Aspect 6 is the method of any of aspects 1 to 5, further including: excluding the satellite from a positioning session of a UE in response to the estimated position of the satellite being associated with the error.

Aspect 7 is the method of aspect 6, where excluding the satellite from the positioning session of the UE includes: removing at least some of the ALM data or the EPH data of the satellite from the positioning session of the UE.

Aspect 8 is the method of any of aspects 1 to 7, further including: transmitting an indication of the error to at least one RSU in the set of RSUs or to at least one UE.

Aspect 9 is the method of any of aspects 1 to 8, where the at least one measurement include at least one of: a PR between each RSU in the set of RSUs and the satellite, the estimated position of the satellite computed at each RSU in the set of RSUs based on the ALM data or the EPH data of the satellite, or a clock offset associated with the satellite computed at each RSU in the set of RSUs based on the ALM data or the EPH data of the satellite.

Aspect 10 is the method of any of aspects 1 to 9, further including: receiving a location of each of the set of RSUs from the set of RSUs.

Aspect 11 is the method of any of aspects 1 to 10, further including: selecting the set of RSUs for obtaining the at least one measurement for the satellite based on the location of each of the set of RSUs.

Aspect 12 is the method of any of aspects 1 to 11, where the set of RSUs includes at least four RSUs.

Aspect 13 is the method of any of aspects 1 to 12, where the network entity is a base station, a component of the base station, a location server, or an RSU within the set of RSUs.

Aspect 14 is the method of any of aspects 1 to 13, where the satellite is an SV, a GNSS satellite, a LEO satellite, a MEO satellite, a GEO satellites, or a HAPS.

Aspect 15 is an apparatus for wireless communication at a network entity, including: a memory; and at least one processor coupled to the memory and, based at least in part on information stored in the memory, the at least one processor is configured to implement any of aspects 1 to 14.

Aspect 16 is the apparatus of aspect 15, further including at least one of a transceiver or an antenna coupled to the at least one processor.

Aspect 17 is an apparatus for wireless communication including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

Aspect 19 is a method of wireless communication at an RSU, including: performing at least one of: a measurement of a PR between the RSU and a satellite, an estimation of a position of the satellite based on EPH data or ALM data of the satellite, or an estimation of a clock offset associated with the satellite based on the EPH data or the ALM data of the satellite; transmitting at least one of the measurement of the PR, the estimation of the position of the satellite, or the estimation of the clock offset for the satellite to a network entity; and receiving information associated with the satellite from the network entity based on the measurement of the PR, the estimation of the position of the satellite, or the estimation of the clock offset.

Aspect 20 is the method of aspect 19, where the information is an indication of an error, further including: forwarding the indication of the error to at least one UE.

Aspect 21 is the method of aspect 19 or aspect 20, further including: transmitting at least one of a scale factor, a weight factor, or a quality indication associated with the satellite to at least one UE, where at least one of the scale factor, the weight factor, or the quality indication is based on the received information.

Aspect 22 is the method of any of aspects 19 to 21, further including: transmitting a location of the RSU to the network entity.

Aspect 23 is the method of aspect 22, further including: receiving a request from the network entity to perform at least one of the measurement of the PR, the estimation of the position of the satellite, or the estimation of the clock offset for the satellite based on the transmitted location of the RSU.

Aspect 24 is the method of any of aspects 19 to 23, where the satellite is an SV, a GNSS satellite, a LEO satellite, a MEO satellite, a GEO satellites, or a HAPS.

Aspect 25 is the method of any of aspects 19 to 24, where the network entity is a base station, a component of the base station, a location server, or a second RSU.

Aspect 26 is an apparatus for wireless communication at an RSU, including: a memory; and at least one processor coupled to the memory and, based at least in part on information stored in the memory, the at least one processor is configured to implement any of aspects 19 to 25.

Aspect 27 is the apparatus of aspect 26, further including at least one of a transceiver or an antenna coupled to the at least one processor.

Aspect 28 is an apparatus for wireless communication including means for implementing any of aspects 19 to 25.

Aspect 29 is a computer-readable medium (e.g., a non-transitory computer-readable medium) storing computer executable code, where the code when executed by a processor causes the processor to implement any of aspects 19 to 25.

What is claimed is:

1. An apparatus for wireless communication at a network entity, comprising:
   at least one network interface;
   at least one memory; and
   at least one processor coupled to the at least one memory and the at least one network interface and, based at least in part on second information stored in the at least one memory, the at least one processor is configured to:
   receive, from each road side unit (RSU) in a set of RSUs via the at least one network interface, information related to a satellite, wherein the information related to the satellite includes at least one of: (1) a pseudo-range (PR) between each RSU in the set of RSUs and the satellite, (2) an estimated position of the satellite computed at each RSU in the set of RSUs, or (3) a clock offset associated with the satellite computed at each RSU in the set of RSU, wherein the network entity is a base station, a component of the base station, a location server, or an RSU within the set of RSUs;
   estimate a position of the satellite based on the information related to the satellite from the set of RSUs and locations of the set of RSUs; and
   identify whether the estimated position of the satellite is associated with an error based on a comparison of the estimated position of the satellite with almanac (ALM) data or ephemeris (EPH) data of the satellite.

2. The apparatus of claim 1, wherein to identify whether the estimated position of the satellite is associated with the error, the at least one processor is configured to:
   estimate a second clock offset associated with the satellite, wherein the error associated with the estimated position of the satellite is further based on the estimated second clock offset.

3. The apparatus of claim 1, wherein to receive the information related to the satellite, the at least one processor is configured to: receive the information related to the satellite periodically or on-demand.

4. The apparatus of claim 1, wherein the at least one processor is further configured to:
   include the satellite in a positioning session of a user equipment (UE) in response to the estimated position of the satellite being associated with the error; and
   assign a scale factor, a weight factor, or a quality indication to the satellite based on the error.

5. The apparatus of claim 1, wherein the at least one processor is further configured to:
   exclude the satellite from a positioning session of a user equipment (UE) in response to the estimated position of the satellite being associated with the error.

6. The apparatus of claim 5, wherein to exclude the satellite from the positioning session of the UE, the at least one processor is configured to: remove at least some of the ALM data or the EPH data of the satellite from the positioning session of the UE.

7. The apparatus of claim 1, wherein the at least one processor is further configured to:
   transmit an indication of the error to at least one RSU in the set of RSUs or to at least one user equipment (UE).

8. The apparatus of claim 1, wherein the at least one processor is further configured to:
   receive, from each RSU in the set of RSUs via the at least one network interface, a location of the RSU.

9. The apparatus of claim 1, wherein the at least one processor is further configured to:
   select the set of RSUs for receiving the information related to the satellite based on the locations of the set of RSUs.

10. The apparatus of claim 1, wherein the set of RSUs includes at least four RSUs.

11. The apparatus of claim 1, wherein the satellite is a space vehicle (SV), a global navigation satellite system (GNSS) satellite, a low earth orbit (LEO) satellite, a medium earth orbit (MEO) satellite, a geosynchronous (GEO) satellites, or a high-altitude pseudo satellite (HAPS).

12. A method of wireless communication at a network entity, comprising:

receiving, from each road side unit (RSU) in a set of RSUs via at least one network interface, information related to a satellite, wherein the information related to the satellite includes at least one of: (1) a pseudo-range (PR) between each RSU in the set of RSUs and the satellite, (2) an estimated position of the satellite computed at each RSU in the set of RSUs, or (3) a clock offset associated with the satellite computed at each RSU in the set of RSU, wherein the network entity is a base station, a component of the base station, a location server, or an RSU within the set of RSUs;

estimating a position of the satellite based on the information related to the satellite from the set of RSUs and locations of the set of RSUs; and identifying whether the estimated position of the satellite is associated with an error based on a comparison of the estimated position of the satellite with almanac (ALM) data or ephemeris EPH) data of the satellite.

13. The method of claim 12, wherein identifying whether the estimated position of the satellite is associated with the error comprises:

estimating a second clock offset associated with the satellite, wherein the error associated with the estimated position of the satellite is further based on the estimated second clock offset.

14. The method of claim 12, further comprising:

including the satellite in a positioning session of a user equipment (UE) in response to the estimated position of the satellite being associated with the error; and assigning a scale factor, a weight factor, or a quality indication to the satellite based on the error.

15. The method of claim 12, further comprising:

excluding the satellite from a positioning session of a user equipment (UE) in response to the estimated position of the satellite being associated with the error.

16. The method of claim 12, further comprising:

transmitting an indication of the error to at least one RSU in the set of RSUs or to at least one user equipment (UE).

17. The method of claim 12, further comprising:

receiving, from each RSU in the set of RSUs via the at least one network interface, a location of the RSU.

18. The method of claim 12, further comprising:

selecting the set of RSUs for receiving the information related to the satellite based on the locations of the set of RSUs.

19. A non-transitory computer-readable medium storing computer executable code at a network entity, the code when executed by at least one processor causes the at least one processor to:

receive, from each road side unit (RSU) in a set of RSUs via at least one network interface, information related to a satellite, wherein the information related to the satellite includes at least one of: (1) a pseudo-range (PR) between each RSU in the set of RSUs and the satellite, (2) an estimated position of the satellite computed at each RSU in the set of RSUs, or (3) a clock offset associated with the satellite computed at each RSU in the set of RSUs, wherein the network entity is a base station, a component of the base station, a location server, or an RSU within the set of RSUs;

estimate a position of the satellite based on the information related to the satellite from the set of RSUs and locations of the set of RSUs; and identify whether the estimated position of the satellite is associated with an error based on a comparison of the estimated position of the satellite with almanac (ALM) data or ephemeris (EPH) data of the satellite.

* * * * *